EFFECT OF 1,2-CYCLOHEXYLENEDIMETHYLENE UNITS, DESIGNATED OBN, IN BLENDS WITH POLY(TETRAMETHYLENE GLYCOL,) ABBREVIATED PTMG, ON THE PERCENT PERMANENT SET AT VARIOUS TEMPERATURES OF SPANDEX POLYMERS DERIVED FROM A POLYMERIC GLYCOL, P-XYLYLENE DIISOCYANATE AND 1,4-CYCLOHEXANEBIS(METHYLAMINE), AS ILLUSTRATED BY EXAMPLES 27 AND 28. THE ELASTOMERS REPRESENTED BY THE CURVES ARE ALL PREPARED FROM POLYMERIC GLYCOLS HAVING A MOLECULAR WEIGHT OF ABOUT 2,000.

CURVE A REPRESENTS A SPANDEX CONTAINING PTMG (0% OBN).
CURVE B REPRESENTS A SPANDEX CONTAINING 98% PTMG AND 2% OBN.
CURVE C REPRESENTS A SPANDEX CONTAINING 97% PTMG AND 3% OBN.

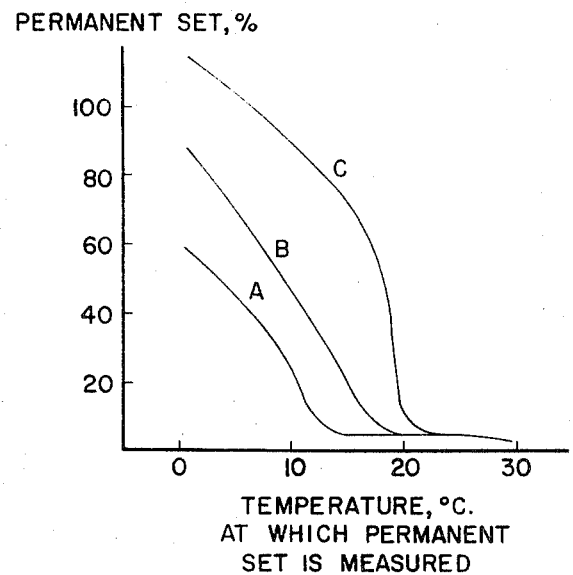

FIG. I

BURNS DAVIS
CHARLES J. KIBLER
JAMES G. SMITH
*INVENTORS*

United States Patent Office

3,597,398
Patented Aug. 3, 1971

3,597,398
SPANDEX POLYMERS OF POLYMERIC DIOLS, FUNCTIONALLY ALIPHATIC DIISOCYANATES AND NON-HINDERED FUNCTIONALLY ALIPHATIC DIAMINES
Burns Davis and Charles J. Kibler, Kingsport, Tenn., and James G. Smith, Waterloo, Ontario, Canada, assignors to Eastman Kodak Company, Rochester, N.Y.
Continuation-in-part of applications Ser. No. 378,950 and Ser. No. 379,002, both filed June 29, 1964. This application Mar. 18, 1968, Ser. No. 713,967
Int. Cl. C08g 22/04
U.S. Cl. 260—77.5AM
18 Claims

ABSTRACT OF THE DISCLOSURE

Elastomeric spandex fibers of segmented urea/urethane/ether copolymers wherein the ether portion is derived from a poly(tetramethylene) glycol or a copolymer thereof which may include 1,2-cyclohexylenedimethyleneoxy (called OBN) repeat units, the urethane portion is derived from a functionally aliphatic non-hindered hydrocarbon diisocyanate, the urea portion is derived by chain-extension from water and/or a functionally aliphatic non-hindered hydrocarbon diamine, said segmented copolymer having from 2 to 8 percent by weight of urea segments whereby the segmented copolymer can be dissolved in normally useful solvents for spinning spandex fibers and solutions can be obtained which possess substantially constant viscosity, are stable against gelation and can be spun into textile fibers. When chain-extension is only 70 to 98 percent completed before spinning, the fibers spun can be improved by treatment with a water medium such as steam or humidity in the atmosphere. When OBN is present as a repeat unit in the copolymer glycol the low temperature properties of the spandex fibers are enhanced.

---

This application (hereinafter called Case AC) is a continuation-in-part of Ser. No. 378,950 and Ser. No. 379,002, both filed on June 29, 1964, and both are abandoned as of the filing date of the present Case AC.

This invention relates to improved spandex textile fibers, novel copolymers of which such fibers are composed, stable spinning solutions of these copolymers and a process for solution spinning improved elastomeric textile fibers of the spandex type.

Subject matter of this general nature is disclosed in the prior art such as U.S. Pat. No. 2,929,804 issued in March 1960; U.S. Reissue Patent No. Re. 24,691 reissued in August 1959 and other prior art referred to hereinbelow.

The present invention provides a new and unexpected further improvement in the spandex art, especially as regards textile fibers of spandex polymers (segmented copolymers) containing urea as contrasted to ureylene segments.

Prior to this invention spandex textile fibers of segmented copolymers containing urea or ureylene segments were illustrated by working examples in the prior art which disclosed the use of functionally aromatic diisocyanates, although some references indicate that functionally aliphatic diisocyanates may also be useful. Moreover, when urea segments are employed, the prior art teaches those having ordinary skill in the art that the percentage by weight thereof in the segmented copolymer should be from about 10% to about 40% urea segments.

According to this invention certain very carefully identified groups from among well known reactants are combined in accordance with carefully defined limitations in quite unobvious proportions so as to obtain spandex polymers which can quite unexpectedly be solution spun into spandex fibers of improved utility, even though they contain only 2 to 8% by weight of urea segments in the segmented copolymer. Thus, even so little as 2 to 3% up to about 6% of urea segments gives spandex polymers of great utility. This is especially surprising because the prior art indicates a clear preference for using functionally aromatic diisocyanates. Moreover, useful textile fibers cannot be spun, as shown by experimental data, when endeavoring to employ functionally aliphatic non-hindered diisocyanates and functionally aliphatic non-hindered diamines because of the fact that it has only been found to be possible to produce spandex polymers which are soluble in normally useful spinning solvents and which do not gel in a reasonable period of time when the percentage of urea segments is substantially less than 10 percent.

Although unrelated prior art concerning polyurethane foams, rubber sheeting substitutes, and the like teaches that aliphatic reactants will permit making relatively non-yellowing products, the spandex fiber art has not yet successfully overcome the tendency toward yellowing. Thus, no spandex fiber was being marketed in 1967 which has the exceptional non-yellowing characteristics of the spandex fibers of the present invention. See "Women's Wear Daily," Oct. 27, 1967, page 42.

As of the date the parent patent application was filed the following circumstances existed:

(1) Research workers as of June 29, 1964 would have expected functionally aliphatic diisocyanates to be substantially less useful than functionally aromatic diisocyanates in preparing spandex polymers having textile utility.

(2) A chemical spinning method for preparing spandex fibers would be expected to have some utility when spinning a spandex polymer which contained somewhat less than 10 percent urea segments, whereas a solution spinning method would be expected to have rather doubtful utility in the range below 10 percent; however, research workers as of June 29, 1964 using either method would expect optimum properties when more than 10 percent urea segments were present in the spandex polymeric fibers.

(3) Research workers as of June 29, 1964 who might try experiments with functionally aliphatic diisocyanates would be expected to first try to produce spandex polymers having more than 10% of urea segments; and, such research workers who did so would most probably fail to obtain spandex polymers which could be solution spun into useful textile fibers due to rapid gelation of solutions in solvents considered to have the most likely utility.

(4) Moreover, research workers as of June 29, 1964 who were seeking spandex polymers having textile utility accompanied by improved resistance to yellowing of fabrics would have had no clearly established basis for making predictions as to what spandex polymer compositions would be most advantageous.

(5) Furthermore, there was no basis as of June 29, 1964 for predetermining the properties of fibers of novel spandex fibers, e.g. return power, permanent set, and other characteristics of unobviously improved nature as provided by the present invention.

This application is identified as Case AC in a series of related patent applications filed in the U.S. Patent Office.

The previously filed cases were all filed on June 29, 1964 and are identified as follows:

| Case | Ser. No. | Status |
|---|---|---|
| A | 379,002 | Abandoned; continued in part in present application. |
| B | 379,020 | Abandoned. |
| C | 378,950 | Abandoned; continued in part in present application. |
| D | 378,961 | Abandoned. |
| E | 379,019 | Do. |
| F | 378,951 | Do. |
| G | 378,711 | U.S. Patent 3,415,790 issued December 10, 1968. |
| H | 378,963 | U.S. Patent 3,386,942 issued June 4, 1968. |

This particular Case AC covers new and improved non-yellowing spandex fibers of novel segmented copolymers which are poly(ether-urethane-ureas) composed of (1) polyethers (homopolymers and copolymers) including urethane linked oligomers thereof having a molecular weight of from about 600 to about 12,000 (2) organic functionally aliphatic non-hindered diisocyanates, and (3) water and/or organic functionally aliphatic non-hindered diamines, in which segmented copolymers from 2 to 8% by weight consists of urea segments. The surprising utility of these spandex fibers is in a large part due to the unexpected discovery that functionally aliphatic diisocyanates can be successfully reacted with polyethers having relatively high molecular weights and then be chain-extended, such as by using the process of Case E and advantageously also the process of Cases F and/or G. The successful use of water as a chain-extender in Case AC achieves surprisingly advantageous results. The spandex fibers of Case AC have greatly improved non-yellowing properties, superior elastomeric characteristics and other improved properties as compared to the prior art. Certain advantageous properties of these spandex fibers are due to the unexpected discovery that functionally aliphatic m- or p-xylylene diisocyanate can be especially advantageously reacted with certain polyether copolymers having relatively high molecular weights and then be chain-extended. Certain spandex fibers are unexpectedly superior with respect to their properties at low temperatures as a result of the employment of particular copolyethers in which at least a major weight proportion have the general formula:

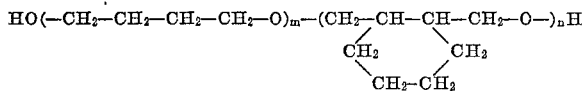

where $m$ is 3 to 100 times $n$, including urethane linked oligomers thereof, said oligomers having a molecular weight of from about 1,200 to about 24,000, and mixtures of one or more of said copolyethers with any desired proportion of a poly(tetramethylene glycol), including urethane-linked oligomers thereof, said polyethers and/or oligomers having a molecular weight of from about 600 to about 24,000. Exceptionally useful spandex fibers can be produced from copolymers having only 2% to 6% by weight of urea segments. The polyether portion can be replaced with a polyester or poly(ester-ether) of analogous properties.

An object of this invention is to provide new synthetic essentially non-cross-linked elastomeric filaments, sometimes called spandex fibers, which possess unexpectedly improved elastomeric characteristics and are so greatly improved in their resistance to yellowing that they can be considered as substantially non-yellowing in normal use. A further object is to provide new and improved essentially linear segmented polyurethane copolymers which can be readily formed into such elastomeric filaments or other shaped elastomeric products. An additional object is to provide spinning solutions of such copolymers whereby filaments can be readily spun by wet or dry spinning procedures.

According to one aspect of this invention there is provided an elastomeric fiber of a linear segmented urea/urethane/ether copolymer having a melt temperature above 150° C. and an inherent viscosity of at least 2.0 when dissolved in a mixture consisting of 60% phenol and 40% tetrachloroethane, said copolymer containing from about 2% to about 8% by weight of said copolymers, of urea segments, essentially all of which are connected to polyether residues through urethane linkages, said urea segments containing at least one repeating unit of a polyurea having a melting point of at least 200° C. in the fiber forming molecular weight range of about 10,000, said repeating unit being selected from the group consisting of:

(1) —A—NH—CO—NH—D—NH—CO—NH—

(2) 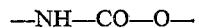 —A—NH—CO—NH—, and (3) mixtures of (1) and (2), wherein —A— is the bivalent hydrocarbon radical of a diisocyanate having the formula: OCN—A—NCO and wherein each isocyanate radical is attached to an alpha carbon atom which is attached to three other atoms, said alpha carbon atoms are each attached to less than three carbon atoms, and the beta carbon atoms are each attached to less than four carbon atoms, and wherein —D— is the bivalent hydrocarbon radical of a non-hindered diamine having the formula $H_2N$—D—$NH_2$, wherein each amino radical is attached to an alpha carbon atom which is attached to three other atoms, said alpha carbon atoms are each attached to less thn three carbon atoms, and the beta carbon atoms are each attached to less than four carbon atoms, essentially all of said urea segments being connected to polyether residues by urethane linkages of the formula:

—NH—CO—O— wherein the —NH of said urethane linkage is attached to the terminal radical —A— of said urea segment and the —CO—O— of said urethane linkage is attached to residues remaining after the removal of the terminal hydroxyl groups of a polyether glycol having a melting point below about 50° C., having an average molecular weight in the range of from about 600 to about 12,000, and consisting essentially of a member selected from the group consisting of:

(A) A hydroxyl-terminated linear series of divalent —$CH_2$—$CH_2$—$CH_2$—$CH_2$— groups joined by intra-linear ether oxygen atoms, (B) Oligomers of said (A) connected by from 1 to 10 intra-linear linkages having the formula:

 —O—CO—NH—A—NH—CO—O— wherein —A— is defined above, (C) A hydroxyl-terminated linear series of divalent hydrocarbon groups joined by intra-linear ether oxygen atoms, and having the general formula:

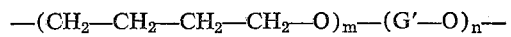 —($CH_2$—$CH_2$—$CH_2$—$CH_2$—O)$_m$—(G'—O)$_n$— wherein $m$ is 3 to 100 times $n$, G' is a divalent hydrocarbon group containing at least 2 carbon atoms and said hydrocarbon groups are distributed in a random manner in said linear series, (D) Oligomers of said (C) connected by from 1 to 10 intra-linear linkages having the formula:

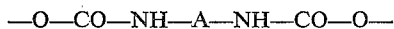 —O—CO—NH—A—NH—CO—O— wherein —A— is defined above, (E) A mixture of glycols defined by (A) or (C), or a mixture of glycols defined by the combination of both (A) and (C), or a mixture of glycols defined by the combination of (A) or (C) or both (A) and (C) with up to 20 weight percent of the latter mixture being glycols which are hydroxyl terminated linear series of divalent hydrocarbon groups G' having at least two carbon atoms in each G' group joined by intra-linear ether oxygen atoms, (F) Oligomers of said (E) connected by from 1 to 10 intra-linear linkages having the formula:

—O—CO—NH—A—NH—CO—O— wherein —A— is defined above.

The instant invention and the other seven related inventions pertain to elastomeric fibers and segmented polyurethane copolymers of which such fibers are composed. Prior art illustrative of related copolymers and elastomeric fibers includes Steuber U.S. Pat. 2,929,804 which discloses poly(ether-urethane-ureas) and Schilt U.S. Pat. 3,097,192 which discloses poly(ester-urethane-ureas) wherein the urea segments are present in an amount of from about 10% to about 40% by weight of the segmented copolymer and wherein all of the working examples teach that the urethane linkages are directly connected by an aromatic nuclear linkage, the advantageous character of this aromatic nuclear linkage being also emphasized elsewhere in the Steuber and Schilt specifications. Other related disclosures include U.S. 2,843,568; U.S. 2,929,800; U.S. 2,929,802; U.S. 2,929,803; U.S. 2,948,691; U.S. 2,957,852; U.S. 2,965,437; U.S. 3,044,987; U.S. 3,071,557 and U.S. 3,111,368; also Re. 24,689 and Re. 24,691.

Although the art is fairly well developed in the spandex fiber field, there are such a large number of unpredictable variables that it is very difficult to achieve further improvements as a result of experimentation since most experiments lead to inferior results. Discoveries in this field must therefore be considered as applicable to only those segmented copolymers as are clearly within the purview of the experimental results as established by working examples.

As a consequence of extensive research and investigation in this field, the above-mentioned series of related inventions have been made with respect to segmented polyurethane copolymers and elastomeric filaments thereof which are also referred to herein as spandex fibers. The inventions which are inter-related are partially summarized as follows.

Case B filed by Davis, Kibler and Smith covers new and improved non-yellowing spandex fibers of novel segmented copolymers which are poly(ether-urethane-ureas) composed of (1) polyethers including urethane linked oligomers thereof having a molecular weight of from about 600 to about 10,000, (2) organic functionally aliphatic diisocyanates, and (3) organic functionally aliphatic hindered diamines of which up to 50 mole percent can be replaced with water, in which segmented copolymers from about 5 to about 25% by weight consists of urea segments. The surprising utility of these spandex fibers is in a large part due to the unexpected discovery that functionally aliphatic diisocyanates can be successfully reacted with polyethers of an unexpectedly wide range of molecular weights when the chain-extender diamine has a functionally hindered aliphatic structure. The spandex fibers of this invention have greatly improved non-yellowing properties as compared to the prior art. They also have excellent elastomeric characteristics. The polyether portion can be replaced with a polyester or poly(ester-ether) of analogous properties. In order to provide satisfactorily spinnable dopes according to Case B when the urea segment is appreciably more than about 9% by weight of the segmented copolymer, it is generally necessary to use a process as described in Case E and advantageously also the processes of Case F and/or Case G. The modulus values of fibers at elongations of greater than 100% are at their most advantageous values when the hard segment is appreciably more than 9% by weight of the segmented copolymer.

Case D has been abandoned without prejudice to the other cases.

Case E filed by Davis and Lyon covers a new and improved process for preparing those segmented polyurethane copolymers where the urea segment comprises from about 2–8% by weight of the copolymer as in Case AC and 5–25% as in Case B. Unexpectedly, it was discovered that rapid smooth reactions between the macro-diisocyanates and the chain-extender diamines (the employment of water is excluded) could be achieved by a relatively quite hot solution polymerization process in the range of 60–200° C. (preferably 75°–150° C.) despite prior art teachings showing a preference that room temperatures or ice baths should be employed to avoid difficulties such as the formation of intractable gels. Moreover, the employment of high temperature polymerization was found to make possible the formation of more concentrated dopes of greater utility in spinning fibers. Even more advantageous results are achieved in combination with the process of Case F and/or Case G. The polyether portion of the segmented copolymer can be replaced with a polyester or poly(ester-ether) of analogous properties.

Case F filed by Knowles and Smith covers a new and improved process for preparing stable spinning solutions of those segmented polyurethane copolymers covered by U.S. 2,929,804, U.S. 3,097,192 and Cases AC, B and D, thereby including those segmented copolymers derived from polyesters and poly(ester-ethers) as well as polyethers, where the urea segment comprises from about 2 to about 40% by weight of the copolymer. The process comprises making a solution of the segmented copolymer according to a solution polymerization process which is followed by incorporating therein from 0.01 to 5% by weight of the copolymer of a stabilizer selected from acid halides and anhydrides of monocarboxylic acids. These stabilized solutions can be stored for extended periods of time without gelation or precipitation. These solutions can be used as such or modified with other solvents and spun so as to yield fibers of improved uniformity and optimum properties.

Case G filed by Davis and Schulken covers a new and improved process for preparing new and improved copolymers and fibers thereof from novel spinning solutions of improved stability. Case G covers those segmented polyurethane copolymers covered by U.S. 2,929,804, U.S. 3,097,192 and Cases AC, B and D thereby including those segmented copolymers derived from polyesters and poly(ester-ethers) as well as polyethers, where the urea segment comprises from about 2 to 40% by weight of the copolymer. The process comprises first preparing a macro-diisocyanate from one or more aliphatic or aromatic diisocyanates and a polyether, polyester, or poly(ester-ether) in a mole ratio substantially greater than 1.3 to 1 so as to form a macro-diisocyanate, treating the macro-diisocyanate so as to remove a substantial amount (40–100%) of the unreacted diisocyanate and then chain-extending the treated macro-diisocyanate with water and/or one or more aliphatic or aromatic organic diamines by a solution polymerization process to form a stable solution containing 5 to 50% by weight of segmented copolymer. This process unexpectedly yields stable solutions which can be stored for greatly extended periods of time before being spun into spandex fibers. These solutions can be used as such or modified with other solvents prior to spinning.

Case H filed by Bell, Kibler and Smith is related to their earlier U.S. application Ser. No. 166,155 filed Jan. 15, 1962 (now U.S. Pat. No. 3,238,178 patented Mar. 1, 1966) and covers new and improved spandex fibers of segmented polyurethane copolymers in which stabilizers are present, the copolymers being those described in Cases AC and B and also including those segmented copolymers derived from polyesters and poly(ester-ethers) as well as polyethers, where the urea segment comprises from about 2 to 25% by weight of the copolymers. Case H is limited to the use of functionally aliphatic diisocyanates and diamines (if not replaced by water). Case H provides stabilized characteristics which advantageously supplement the non-yellowing properties inherent in the copolymers of Cases AC and B as fibers, films, and other shaped articles. The stabilized copolymers include a class (1) additive and usually at least one other additive of the following five classes of additives:

(1) From 0.1% to 10% by weight of the segmented copolymer of a 2,4,6-trialkylphenol stabilizer wherein the sum of the carbon atoms in all of the three alkyl radicals is from 20 to 60, (2) Optionally from 0.1 to 5% of a thioester which is a mono or dihydric alcohol ester of thiodipropionic acid or thiodibutyric acid in which the monohydric alcohol radicals are present in simple esters as alkyl radicals having from 12 to 20 carbon atoms and the dihydric alcohol radiacls are present in polyesters as alkylene radicals having from 2 to 20 carobn atoms, said polyester having at least two repeating units and a molecular weight of from about 400 to about 4000, (3) Optionally from 0.1% to 2% of an organic phosphite having at least 2 organic radicals each of which has from 1 to 40 carbon atoms, especially organic radicals composed of carbon atoms, hydrogen atoms, and which optionally may include intra-linear —O— or —S— atoms between carbon atoms, said phosphites being monomeric or polymeric in molecular structure, (4) Optionally from about 1% to about 15% of an aliphatic amine having a molecular weight above about 280 which is defined by U.S. Pat. 2,999,839, (5) Optionally from 1% to 30% of titanium dioxide and/or one or more other inorganic pigments.

The sum of the percentages of the first four classes of additives is not to exceed about 15% based on the weight of the segmented copolymer.

Spandex fibers covered by Cases AC and B which are also among those included in Cases D-H, inclusive, are generally characterized in that:

(1) They have a tenacity of at least 0.25 g./den., (2) They do not break when heated for about 5 sec. under a tension of 0.02 g./den. at about 150° C., (3) They have an inherent viscosity of at least 2.0 when dissolved in 60% phenol and 40% tetrachloroethane. The inherent viscosities are measured using solutions at about 25° C. where the concentration is from about 0.02 to 0.5 gram per 100 ml. of solution. Usually the concentration is 0.25 g./100 ml. except that a lesser concentration is employed when the solubility in 60% phenol and 40% tetrachloroethane is not sufficient. The slope of the curve representing inherent viscosities at various concentrations is generally rather flat; thus, the corresponding intrinsic viscosity is usually only slightly different from the values given for inherent viscosity. The procedural details for measuring inherent viscosities are given by K. Izard in Journal of Applied Physics, vol. 20, p. 564 (1949). Further details are given by Schulken and Sparks in Journal of Polymer Science, vol. 26, p. 227 (1957), (4) They have a permanent set of less than 25% based on their original length, in 1 minute and less than 15% in 60 minutes after releasing the tension following (a) elongation to 4 times their original length (300% extension) at the rate of at least 4,000% per minute, (b) thereafter allowing immediate contraction to 2.5 times their original length (150% extension), (c) holding at this length for 16 hours at room temperature, and (d) then releasing the tension; when it is desired to determine permanent set at other than room temperature, the sample at the end of 16 hours is immersed in a water bath at any given temperature until equilibrium is reached and then permanent set is measured in the water bath after releasing the tension, (5) They have a return power greater than 0.010 g./den. measured during the latter half of the second cycle, i.e., at 100 percent extension during return from the second cycle of extension to 200 percent. The term "power" can be applied to a measurement of stress at any given point of elongation. More specifically, "extension power" is measured in any given cycle (usually in the second cycle) while increasing the extension of a sample by any given percentage. Return power may be measured after elongation to three times their original length (extension to 200 percent), then relaxed, then again elongated (second cycle) to 200 percent extension, and then partially relaxed to an intermediate point at which it is at an extension of 100 percent. Measurement is then made of the stress which is called return power at 100 percent extension after two cycles to 200 percent extension. A similar return power measurement can be made at 100 percent extension during return from the second cycle of extension to 400 percent. If set occurs in the sample after the first cycle, an adjustment is made in the final measurement to take this into account.

(6) When released after elongation to 5 times their original length (400 percent extension) at the rate of at least 4,000 percent per minute, they are capable of recovering at least 95 percent of their elongation within one minute (this is called elastic recovery), (7) When released after elongation to 1.5 times their original length (50 percent extension) at the rate of about 100 percent per minute, they are capable of recovering at least 97 percent of their elongation within one minute, (8) They retain substantially their original color after 3 cycles of gas exposure according to AATCC standard test method 23–1962, cf. AATCC Technical Manual Part II–B–73, vol. XXXIX, 1963, "Colorfastness to Oxides of Nitrogen in the Atmosphere."

The segmented ployurethane copolymers of this invention can be prepared by various processes as described in the references cited above. However, it is considered especially advantageous to employ the following dual-operation process which is considered especially novel with respect to (a) those features covered by Cases E, F and G, (b) the combination of reactants, their proportions, the molecular weight of the macrodiisocyanate and the aliphatic nature of the isocyanate linkages as covered by Cases AC and B, and (c) the nature of certain polyethers employed. The two basic operations of the overall process are as follows:

FIRST PROCESS OPERATION

A macro-diisocyanate is prepared by heating for from 2 to 10 hours at about 0°–175° C., optionally in the presence of a catalyst, under an inert atmosphere, a mixture of a diisocyanate and a polyether, in a mole ratio greater than 1 to 1, for example, from about 1.3 to 1 to about 10 to 1. The moles of remaining diisocyanate and macro-diisocyanate produced are calculated from the proportions of the reactants and the kinetics of the reaction as covered by Case G in particular.

Poly(ester - urethane - ureas) and poly(ester - ether-urethane-ureas) can be similarly prepared by replacing the polyether with an analogous hydroxyl-terminated polyester or poly(ester-ether) which can also be designated HO—P—OH as described in U.S. 3,097,192 such as polyethylene adipate, polyneopentyl sebacate, etc. including polyesters of hydroxycarboxylic acids where the carboxy end groups are terminated with a glycol, e.g. the polyester of 6-hydroxyhexanoic acid terminated with diethylene glycol, neopentyl glycol, 1,4-cyclohexanedimethanol, 1,4-butylene glycol, etc. Useful polyesters are described in U.S. Pat. No. 3,097,192 in column 4 from line 40 to line 4 of column 5 and in U.S. Pat. Nos. 2,933,477 and 2,933,478.

With respect to this first operation, the moles of unreacted diisocyanate remaining in the macro-diisocyanate reaction mixture can be removed partially or entirely by solvent extraction, distillation or by other process steps as covered by Case G. This is especially advantageous when the ratio of diisocyanate to polyether is greater than about 1.8 to 1.

SECOND PROCESS OPERATION

A segmented polyurethane copolymer is prepared by dissolving the macro-diisocyanate, which may include unreacted diisocyanate, in a solvent, which is also a solvent for the segmented polyurethane copolymer being produced, and either (a) water is added at an elevated temperature or (b) a diamine solution in a solvent which may also be a solvent for the segmented polyurethane copolymer is added, (c) a combination of (a) and (b) is employed. In some cases it is advantageous to gradually add the diamine over a period of from 5 minutes to 5 hours; however, it can be added within a few seconds, especially when a continuous process is employed. With regard to either the addition according to (a), (b) or (c) as just described, the overall ratio of amine radicals to isocyanate radicals is from about 0.7 to about one. The overall ratio may be seemingly less than 0.7 in some cases where water is introduced during the spinning of fibers from a solution of such a segmented copolymer, or while curing in contact with air having a significant relative humidity. When a non-hindered aliphatic diamine is being added it is advantageous, but not necessary, to employ a temperature of 55°–60° C. or higher, i.e., about 60°–200° C., during the addition of the latter half of the non-hindered aliphatic diamine according to the process as covered by Case E. When water is added according to (a) or (c) as described above, the amount of water theoretically required can be calculated based upon the amount of isocyanate radicals which theoretically need to be converted to amine radicals so as to be available for reaction with the unconverted isocyanate radicals. The actual amount of water is advantageously two to twenty or more times the theoretical amount (can be up to 100 times) since the conversion step is relatively quite slow and the presence of excess water presents no particular difficulty in many solution spinning processes.

With respect to the second operation the solution of segmented copolymer which is produced can be stabilized against gelation or precipitation by adding up to 5% by weight of the segmented copolymer of an anhydride or an acid halide of an organic acid as covered by Case F.

Stabilizers as covered by Case H can be added to the solution of segmented copolymer prior to spinning spandex fibers. Other solvents can be added to the solution in order to form a spinning dope of optimum properties. Various spinning procedures are described in the references cited above for preparing spandex fibers, e.g. U.S. 3,111,368; moreover, such fibers can be used for various purposes as illustrated by U.S. 3,017,740, U.S. 3,038,295, U.S. 3,092,953 and U.S. 3,111,805, among others.

Most advantageously the invention of Case AC pertains to segmented polyurethane copolymers capable of forming non-yellowing elastomeric fibers having an elastic recovery from 50% elongation which is above 97%, a stress well below 20%, and other advantageous properties as described herein, said polymer having an essentially linear structure and being a segmented urea/urethane/ether copolymer having a polymer melt temperature above 150° C. and an inherent viscosity of at least 2.0 when dissolved in 60% phenyl and 40% tetrachloroethane, said copolymer consisting essentially of a multiplicity of urea segments containing at least one repeating unit of a fiber-forming polyurea, said repeating unit being of the formulas given above.

The calculation of the percentages of urea segments can be made according to the following equation:

$$U = \frac{YM + ZM\left(\frac{Z'}{Z'+W'}\right) - 26M\left(\frac{W'}{Z'+W'}\right)}{X + Y\left(\frac{Y'}{X'}\right) + ZM\left(\frac{Z'}{Z'+W'}\right) - 26M\left(\frac{W'}{Z'+W'}\right)}$$

U=Weight fraction of urea segments (multiply by 100 to get percentage).

W'=Moles of H₂O actually reacted. Note that essentially all of the diamine will react except for any excess. When Z'/M is less than one, water will react so as to complete the chain extension. Such water may include that present as humidity in the atmosphere.

M=Mole fraction of diisocyanate available for reaction with water and/or diamine, i.e. the remainder from Y' and less X' divided by X. This is calculated as $$M = \frac{Y'}{X'} - 1$$

Y=Molecular weight of diisocyanate.
Y'=Moles of diisocyanate added to polymeric glycol less that removed by evaporation from or extraction of the macrodiisocyanate, e.g. extraction of the polyurethane (macrodiisocyanate) obtained by reaction of X' moles of polymeric glycol with Y' moles of diisocyanate.
X=Molecular weight of polymeric glycol.
X'=Moles of polymeric glycol.
Z=Molecular weight of diamine.
Z'=Moles of diamine.

When water has not been employed in the preparation, these segmented polyurethane copolymers where the urea segment is composed of a single repeat unit can be represented by the general formula:

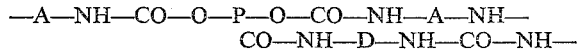

wherein the urea segment has the formula:

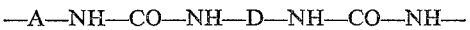

and the soft segment which contains the polyether glycol or other hydroxyl-terminated polymeric residue represented by the formula:

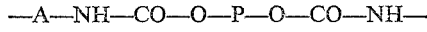

The A and D radicals can be different or the same in each repeat unit of the above formulas.

When water has been employed in the preparation, including mixtures of water as well as diamine, the repeating units are members of the group consisting of (1)

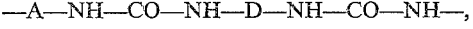

(2) —A—NH—CO—NH—, and (3) mixtures of (1) and (2).

When the polyether glycols are represented by members defined by (E) as set forth above, and they contain about 50 weight percent or more of glycols depicted by (C), i.e., glycols having cycloalkyl groups, the segmented copolymers produced therefrom are further characterized by having a permanent set at 0° C. of less than half that which characterizes corresponding copolymers where the valve of $n$ in said polyether glycol is zero. A similar advantage (not necessarily less than one-half) can more generally be achieved by employing polyether glycols defined hereinabove by (E) wherein the entire amount of the glycols incorporated in the spandex polymer contains at least (calculated as moles of monomeric repeating units in said entire amount) 1.0 mole percent of 1,2-cyclohexylenedimethyleneoxy repeating units. A greater advantage is achieved wherein said percentage is at least 2 mole percent.

The soft segment $(GI)_x$ can be referred to as composed of glycol or other hydroxyl-terminated polymer (HO—P—OH) moieties "G" and diisocyanate moities "I." P can include monomer, dimer, trimer and other oligomer residues as more fully explained elsewhere herein. The urea hard segment $(DI)_y$ can be considered as being composed of diamine moieties "D" and diisocyanate moieties "I." The values of $x$ and $y$ are on the average small integers which are at least 1. The preparation of the macro-diisocyanate from one mole of G and two moles of I can be schematically represented by the following assumed reaction:

(1)                     $2I + G \rightarrow IGI$

However, the resulting macro-diisocyanate as actually obtained was found by statistical calculations and conformed by nuclear magnetic resonance (NMR) evaluation to be a mixture of monomer, oligomers, and unreacted diisocyanate as follows:

(2) $\quad q(2I+G) \to a_0I + a_1IGI + a_2IGIGI + \ldots a_xI(GI)_x + \ldots$ where $q$ represents a large number of molecules as ordinarily present in a reaction subject to statistical evaluation and $a_x$ is equal to the number of molecules of $I(GI)_x$. When $x$ becomes increasingly large the amount, $a_x$, of the oligomer having such as value for $x$ becomes vanishingly small. Thus, the glycol or other polymeric moiety "P" is comprised of monomer "IGI" and a series of oligomers in diminishingly small proportions.

The average composition of the reaction product of 2 moles of I and one mole of G has been found by NMR to be approximately as follows ($x$ is 2):

(3) $\quad 4I + 2G \to I + IGIGI$

When this average representation of the reaction mixture is solution polymerized with diamine "D," the segmented polyurethane copolymer obtained has an average composition approximately as follows ($y$ is 2):

(4) $\quad 2D + I + IGIGI \to (DI)_2GIGI$

Therefore the urea hard segment is on the average composed of two repeat units —(DI)$_2$— rather than —DI— as would theoretically be obtained if the assumed situation actually took place as depicted by Equation 1.

(The above factual analysis explains the discovery of the advantages achieved by removing all of the unreacted diisocyanate "I" from the actual reaction mixture represented by Equation 2 having the average composition represented by Equation 3. When the resulting macro-diisocyanate is reacted with diamine the segmented copolymer obtained has approximately the following average composition where $x$ is 2 and $y$ is 1:

(5) $\quad D + IGIGI \to DIGIGI$

This result can be achieved by the process as covered by Case G whereby the urea hard segments on the average contain only about one repeat unit and the soft segments contain on the average approximately two repeat units, i.e., the macrodiisocyanate is composed of various oligomers which approximate a dimer on the average. Such a segmented copolymer is more soluble, solutions thereof are more stable and optimum fiber-spinning conditions can be much more advantageously obtained as covered by Case G. With respect to Case AC this facilitates the unexpectedly advantageous preparation of segmented copolymers having only 2 to 6% urea hard segments.

The preceding explanation is obviously subject to appropriate variation when different proportions of reactants are employed as will be readily comprehended by those having ordinary skill in this art.

Solvents which can be employed in conducting the solution polymerization process according to the second operation described above are those solvents which are relatively inert to the reactants. Suitable solvents for use in this process include N,N-dimethylformamide, N,N-dimethylacetamide, tetrahydrofuran, dimethylsulfoxide, and mixtures thereof as well as mixtures including other solvents. Dimethylformamide and dimethylacetamide are the preferred solvents for use in the practice of this invention, especially since solutions suitable for the spinning of fibers may be made directly in these solvents.

Among those solvents which can be employed in various situations individually or in various combinations are aliphatic halides such as methylene chloride, chloroform, 1,2-dichloropropane, 1,1,2-trichloroethylene, etc., aromatic halides such as chlorobenzene, bromobenzene, fluorobenzene, dichlorobenzenes, difluorobenzenes, etc., as well as analogs, homologs and isomers of the aliphatic and aromatic halides having from 1 to 12 carbon atoms; cycloaliphatic and aromatic hydrocarbons having from 6 to 12 carbon atoms such as cyclohexane, cumene, cymene, benzene, toluene, xylenes, mesitylene, etc., and isomers and homologs thereof; aliphatic, cycloaliphatic and aromatic ethers having from 4 to 12 carbon atoms such as dibutyl ether, diisopropyl ether, anisole, phenetole, 1,2-dimethoxyethane, 1,2-diethoxyethane, diethylene glycol dimethyl ether, meta- and para-dioxanes, tetrahydrofuran, methyltetrahydrofuran, 8 - oxabicyclo[4.3.0]nonane, etc., and isomers, homologs anod analogs thereof; aliphatic ketones such as diisopropyl ketone, diisobutyl ketone and isomers and homologs thereof having up to 12 carbon atoms and preferably at least 7 carbon atoms; hexamethylphosphoramide and related phosphoramide solvents; acyl nitriles such as acetonitrile, propionitrile, n-butyronitrile, isobutyronitrile, and isomers and homologs having from 2 to 12 carbon atoms; organic linear and cyclic esters having from 2 to 12 carbon atoms such as ethyl acetate, methyl acetate, isobutyl isobutyrate, ethyl propionate, butyrolactone, caprolactone, methyl benzoate, etc., and isomers and homologs thereof; N,N-dialkylacylamides having from 3 to 8 carbon atoms, such as dimethylacetamide, diethylacetamide, dimethylformamide, diethylformamide, dimethylpropionamide, tetramethylurea, including the cyclic analogs such as N-methyl-pyrolidinone, and other isomers, homologs and related analogs; dimethyl sulfoxide, dimethyl sulfolane, and related isomers, homologs and analogs of such solvents containing an —SO— group. Reference is also invited to Caldwell et al. Ser. No. 656,644, filed July 28, 1967, now abandoned which discloses valuable solvent combinations of alcohols and chlorinated hydrocarbons. Some of the solvent constitutents mentioned above can also be present in the extractive chemical compositions employed according to the process of Case G.

The elastic properties of these materials may be varied by suitable compounds. The amount and type of compounding agent to be incorporated is dependent on the use for which the elastomer is intended. The compounding agents ordinarily used in the rubber industry are useful for this invention. These include carbon black, clay, silica, titanium dioxide, or other pigments, and plasticizers. Inorganic and organic coloring agents may be incorporated to give a well-defined color.

The segmented copolymers described herein can also be employed in the form of elastic sheets, film, unwoven fabrics and various shaped articles in a manner analogous to that well known with respect to rubber products.

In Cases AC, B and E—H, inclusive, the polyether glycols having the formula HO—P—OH may be homopolymers or copolymers. The essential features are that they be difunctional and have a melting point below 50° C. The polyethers are primarily poly(alkylene oxide) glycols but some of the oxygens (—O— linkages) may be replaced with sulfur atoms (—S— linkages) and/or some of the alkylene groups may be replaced with arylene (if not connected to a terminal —OH) or cycloaliphatic radicals. Even where the linkages and types of organic radicals are the same, the compositions may still be copolymers, such as a copolyether derived from more than one glycol. Copolymer formation is useful when a macromolecular homopolymer melts too high to be useful in the process. Copolymers usually melt lower and show less tendency to produce undesirable crystallization in this segment of the final copolymer. These macrointermediates have hydroxyl end groups capable of reacting with one of the monomeric constituents of the high melting component to form a urethane linkage, i.e., yielding a macrodiisocyanate.

The polyether glycols comprising a cycloalkyl structure are unexpectedly valuable in achieving surprisingly superior results. These glycols contain alkylene-cycloalkylene-alkylene radicals which have not been specifically mentioned in the preceding paragraph. However, such polyether glycols are considered within the scope of the formula HO—P—OH, which also includes oligomers.

One of the most important properties an elastomer should possess is the ability to return rapidly to its original dimensions after distortion. If the sample does not return to its original dimensions, the distortion induced in the sample is termed permanent set and the amount of distortion is expressed quantitatively as a percentage of the sample's original dimensions. The amount of permanent set varies with the manner in which the deformation is effected and generally becomes greater when the stress is applied for a long period than when the stress is applied for a short period of time. The ability of a distorted sample to return to its original size is also dependent upon the temperature. Lower temperatures favor the development of a high degree of permanent set. That aspect of this invention wherein the polyether glycols comprise a cycloalkyl structure is particularly concerned with this last property.

The permanent set values as defined above can be measured by using filaments of the segmented copolymer or ⅛ inch strips of film prepared from the copolymer. A loop 30 mm. in length and clamped on the ends is drawn by means of a hook to 300% extension (120 mm. length) and then relaxed to 150% extension (75 mm. length) and held for 16 hours at room temperature (about 24° C.). When values at other temperatures are to be ascertained, the entire sample can be immersed in a water bath until equilibrium is reached. The hook is then released, the length measured, and the percentage of set calculated by dividing the increase in length by 30 mm. times 100. This can be repeated at various temperatures. Different extensions and other variations in conditions can also be used.

Representative polyether glycols which may be used include poly(oxathiaalkylene glycols), such as poly(1,4-dioxa-7-thianonane), poly(1-oxa-4-thiahexane), and poly(1,6-dioxa-9-thiahendecane); poly(alkylene glycols), such as poly(ethylene glycol), poly(propylene glycol), poly(tetramethylene glycol), and poly(decamethylene glycol); polydioxolane and polyformals prepared by reacting formaldehyde with other glycols or mixtures of glycols, such as tetramethylene glycol and pentamethylene glycol. Some of the alkylene radicals in these compositions may be replaced with arylene (if not connected to a terminal —OH) or cycloaliphatic radicals.

The difunctional polyethers include poly(alkylene glycols), which may be represented by the formula shown in column 7 of U.S. Pat. No. 2,929,804 which is incorporated herein by reference.

The melting points of the polyether glycols are below about 50° C. For example, poly(tetramethylene glycol) having an average molecular weight of 1,000 melts at about 20° C.; this homopolymer could also be employed as an oligomer having at least two internal

linkages, i.e., a trimer melting at below 50° C. Poly(tetramethylene glycol) of about 3,000 molecular weight melts at about 40° C. It can also be employed as a dimer, trimer or tetramer. The melting points of the polyether glycols are generally not sharp and may vary for a given molecular weight. Thus, some samples of the higher molecular weight polyether glycols (including oligomers) may have apparent melting points as high as 55° C. Preferred hydroxy-terminated polymers comprise polymers of tetramethylene glycol; these include homopolymers and especially copolymers of tetrahydrofuran and 8-oxabicyclo[4.3.0]nonane.

The especially preferred diisocyanates which can be employed in all of Cases AC, B and D–H, inclusive, are functionally aliphatic and most advantageously are those compounds solely composed of hydrogen atoms, up to about 17 or more carbon atoms (e.g. up to 20 carbon atoms) and two isocyanate radicals, each of which isocyanate radicals is attached to a separate carbon atom which is attached to three other atoms by single covalent bonds of the type well known in hydrocarbon chemistry. These are advantageously functionally non-hindered, as defined below with respect to non-hindered diamines. Specific examples of non-hindered, functionally aliphatic diisocyanates include 1,6-hexane diisocyanate and other alkane diisocyanates having from 4 to 20 carbon atoms and position isomers and homologs 1,4-cyclohexane-bis(methyl isocyanate) and position isomers and homologs thereof as well as other alkylene-cycloalkylene-alkylene diisocyanates having from 7 to 20 carbon atoms, cyclohexane-1,4-diisocyanate, etc., and position isomers and homologs thereof, as well as other cycloalkylene diisocyanates having from 5 to 20 carbon atoms, as well as alkylene-cycloalkylene diisocyanates having from 6 to 20 carbon atoms, p-xylylene diisocyanate and position isomers and homologs thereof as well as other alkylene-arylene-alkylene diisocyanates having from 10 to 20 carbon atoms, etc. The cycloalkylene radicals can advantageously include divalent cyclobutane radicals including alkylene-cyclobutylene-alkylene radicals and position isomers as well as homologs thereof having from 8 to 20 carbon atoms.

According to Cases D, F and G (but not the present Case AC) the diisocyanates which can be employed appear to include any aromatic diisocyanate whereby the polyurea hard segment can be present in an amount up to 40 percent by weight. Aromatic diisocyanates are useful in these other cases (but not the present Case AC) because they form polyureas of extremely high melting point.

A "hard segment" containing a unit of such a polymer provides a "tie point" for joining the low-melting, amorphous "soft segments," so that a polymer is produced having good elastic properties, i.e., a high tensile recovery and a low stress decay.

The prior art in some instances takes into account the erroneous assumption that the formation of isocyanate-terminated polyethers (or polyesters) will be accompanied by no appreciable chain lengthening if two moles or more of diisocyanate are reacted per mole of polyether. If less than a 2:1 molar ratio were to be used, it was thought in such instances that a polyether-urethane would be formed with corresponding increase in molecular weight. The use of a 2:1 molar ratio of diisocyanate to polyether was preferred.

The errors in these assumptions are apparent from the present Case AC and in particular with regard to the process covered by Case G.

The diamines employed herein are advantageously diprimary diamines although a small proportion of a disecondary diamine may be included. Two or more diamines can be employed in admixture or in sequence so as to form copolymeric segments which may or may not occur in blocks of identical repeat units. Moreover, the diamine can be a linear polymer having an amino group on each end and containing internal linkages such as urea, amide, sulfonamide, urethane, ester, etc.

Preferred diamines which can be employed in all of Cases AC, B and D–H inclusive, are functionally aliphatic and most advantageously are those compounds solely composed of hydrogen atoms, up to about 17 or more carbon atoms (i.e. up to about 20 carbon atoms), and two amino radicals (preferably —NH₂ radicals), each of which amino radicals is attached to a separate carbon atom which is attached to three other atoms by single covalent bonds of the type well known in hydrocarbon chemistry. The same applies to the preferred diisocyanates for Case AC.

The particularly preferred diamines for Case AC are functionally non-hindered, whereas those which are required to be used for Case B are functionally hindered diamines in which there is a pronounced degree of steric hindrance at the amino groups. The same applies to the preferred diisocyanates for Case AC. Cases D–H, inclusive, can employ either hindered or non-hindered diamines or diisocyanates.

The hindered functionally aliphatic diamines employed in Case B of the first type are those where each of the amino radicals is attached to an alpha carbon atom which is attached to a beta carbon atom which is attached to three other crbon atoms. In other words there is a quaternary C-atom in the β-position with respect to each amino radical. This quaternary carbon atom can be the same atom with respect to both of the amino radicals. Examples of these hindered diamines employed in Case B include 2,2,4,4-tetra-alkyl-1,3-cyclobutanediamines where the alkyl radicals can be the same or different and contain from 1 to 4 carbon atoms, β,β,β',β'-tetra-alkyl-polymethylenediamines where the alkyl radicals contain from 1 to 4 carbon atoms (two of which are positioned in β-relationship to each of the amine radicals) and there are from 4 to 10 carbons in the polymethylene chain as for example 2,2,3,3-tetramethyl-1,4-butanediamine, and 2,2-dialkyl-1,3-propanediamines where the alkyl radicals contain from 1 to 4 carbon atoms such as 2,2-dimethyl-1,3-propanediamine.

The hindered functionally aliphatic diamines of the second type employed in Case B are those where each of the amino radicals is attached to a carbon atom which is attached to three other carbon atoms. In other words there is a tertiary carbon atom in the α-position with respect to each amino radical. Examples of these hindered diamines include 1,8-methanediamine and various homologs thereof as well as many other sterically hindered compounds.

The non-hindered functionally aliphatic diamines are those employed in the present Case AC where neither of the carbon atoms in the α- or β-position is, respectively, a tertiary or a quaternary carbon atom. Examples of these diamines include hexamethylenediamine and those other alkanediamines having from 2 to 20 carbon atoms, 1,4-cyclohexanebis(methylamine) and position isomers and homologs thereof as well as other alkylene-cycloalkylene-alkylene diamines having from 5 to 20 carbon atoms, cyclohexane-1,4-diamine and position isomers and homologs thereof as well as other cycloalkylene diamines having from 3 to 20 carbon atoms, p-xylylene diamine and position isomers and homologs thereof as well as other alkylene-arylene-alkylene diamines having from 8 to 20 carbon atoms. The cycloalkylene radicals can advantageously include divalent cyclobutane radicals including alkylene-cyclobutylene-alkylene radicals and position isomers as well as homologs thereof having from 6 to 20 carbon atoms.

Likewise, non-hindered, functionally aliphatic diisocyanates are employed according to the present Case AC.

The position isomers mentioned in this specification include cis and trans isomers and various mixtures thereof as well as other position isomers such as those in ortho, meta or para positions, etc.

According to Cases D, F and G the primary diamines which can be employed may be aliphatic, alicyclic, aromatic, or heterocyclic diamines. The functionally aromatic diamines are not useful in Case AC. It is required that these diamines be combined with suitable coreactants to form a urea which melts above 200° C.

Suitable diamines for Cases D, F and G include functionally aromatic as well as aliphatic diamines such as ethylenediamine, tetramethylenediamine, pentamethylenediamine, hexamethylenediamine, heptamethylenediamine, octamethylenediamine, p - xylylenediamine, 1,4-diaminocyclohexane, p-phenylenediamine, 1-methyl-2,4-diaminobenzene, bis(p-aminocyclohexyl) methane, and many others. Derivatives of these diamines may also be used as long as the substituents do not interfere with the polymerization. For example, they may have hydrocarbon side chains or be substituted with halogens or nitro groups which are inert under the conditions used herein.

However, only the functionally aliphatic diamines are employed for Cases AC, B, E and H. These are limited to the non-hindered diamines in Case AC and to the hindered variety in Case B. Both varieties can be employed in Cases E and H. Of course, these functionally aliphatic diamines can also be employed in Cases D, F and G along with other types of diamines including functionally aromatic diamines such as tolylenediamine, heterocyclic diamines such as piperazine, substituted piperazines, hydrazine and many others.

It is indicated in the prior art that for utility in fiber and filament applications, it is desirable to have elastic products which require no aftercuring or after-treatment. In order to be suitable in textile applications for the replacement of rubber yarns, a synthetic elastic fiber should have the following properties as a minimum requirement: tensile recovery of 90% or more, stress decay of less than 20%, and fiber sticking temperature of over 150° C. It is readily apparent that the spandex fibers of the present invention are clearly quite superior with respect to the above minimum requirements.

It would have been expected that the proportion of urea hard segments would have to constitute at least about 10% of the segmented copolymer since lower percentages would not be thought to have been capable of forming improved spandex fibers or of forming useful spinning solutions for making such fibers. Moreover, surprisingly great improvement as to low temperature properties is achieved using certain copolyethers. Cases AC, B, D and H cover new and improved compositions and Cases E–G cover new and improved processes and spinning solutions which may also include prior art copolymers in Cases F and G.

The following examples will serve to particularly illustrate the invention of Case AC. The symbol THF represents tetrahydrofuran and OBN represents 8-oxabicyclo-[4.3.0]nonane.

This invention can be further illustrated by the following examples:

EXAMPLES 1–9

Segmented copolymer of copoly (THF+6% OBN), hexamethylene diisocyanate, and hexamethylenediamine A macro-diisocyanate is prepared by adding 3 drops of dibutyl tin dilaurate to a stirred mixture of 6.32 g. (0.0376 mole) of hexamethylene diisocyanate and 83.24 g. (0.0188 mole) of a copolyether (molecular weight 4500) which is prepared from tetrahydrofuran containing 6 mole percent of 8-oxabicyclo[4.3.0]nonane. An exothermic reaction takes place which raises the temperature of the mass to about 90° C. After one hour of stirring, the temperature begins to fall. Stirring is continued for seven hours when titration of a sample with dibutyl amine indicates that the reaction is complete.

This macro-diisocyanate (52.95 g., 0.01103 mole) is dissolved in 360 ml. of N,N-dimethylacetamide and the solution is warmed to 40° C. This solution is stirred vigorously under nitrogen and a solution of 1.28 g. (0.01103 mole) of hexamethylene diamine and 0.40 g. (0.022 mole) of water in 100 ml. of N,N-dimethylacetamide is added over a twenty-minute period while the temperature of the reaction medium is allowed to increase to 76° C.

The viscous dope is immediately spun hot and the fibers, which contain 5.74% hard segment have a tenacity of 0.6 g./d., an elongation of 650%, an elastic recovery of 98.7%, and a 400% power (2nd cycle) of 0.216 g./d., and 0.221 g./d. after boiling for one hour in water. The return power at 100% elongation (after two cycles to 200%) was .024 g./d. and the permanent set after 1 min. was 5.5%, after 60 min. was 3%. See items under general characteristics as set forth above for the definitions of these terms.

The macro-diisocyanate, whose preparation is described in the above Example 1 is polymerized with a number of diamines. The diamines used and the properties of the yarns are shown in the following tables:

COMPOSITIONS PREPARED WITH HEXAMETHYLENE DIISOCYANATE

| Example | Diamine used | Percent hard segment |
|---|---|---|
| 2 | p-Xylene diamine | 6.1 |
| 3 | 1,4-cyclohexanebismethylamine | 6.2 |
| 4 | Ethylene diamine | 4.7 |
| 5 | 4-methylheptane-1,7-diamine | 6.3 |

The calculation of the percentage of hard segment (urea segment) is made according to the formula as set forth hereinabove; differences in numerical values compared to Case A and Case C are due to the use of the more precise formula for calculation and some corrections of inadvertent minor errors.

FIBER PROPERTIES OF POLYMERS PREPARED FROM HEXAMETHYLENE DIISOCYANATE FIBERS BOILED 1 HOUR IN WATER

| Example | Tenacity, g./d. | Elongation, percent | Elastic recovery, percent, from 400% | Power,a g./d. | Return b power, g./d. | Permanent set, percent after— | |
|---|---|---|---|---|---|---|---|
| | | | | | | 1 min. | 60 min. |
| 2 | 0.48 | 650 | 98.2 | 0.192 | 0.021 | 10 | 7 |
| 3 | 0.59 | 580 | 98.7 | 0.283 | 0.022 | 9.5 | 7 |
| 4 | 0.55 | 676 | 98.8 | 0.165 | 0.021 | 10 | 6.5 |
| 5 | 0.56 | 670 | 98.6 | 0.233 | 0.020 | 8 | 4 | a At 400% extension, second cycle.
b At 100% extension during return from 200% extension (second cycle).
NOTE.—See definitions of physical characteristics given hereinabove.

The procedure of Example 1 is repeated using 1,4-cyclohexanebis(methylisocyanate) instead of hexamethylene diisocyanate. The compositions prepared and the properties of their fibers are listed in the following table.

POLYMERS PREPARED FROM 1,4-CYCLOHEXANEBIS (METHYLISOCYANATE)

| Example | Diamine | Weight percent hard segment |
|---|---|---|
| 6 | 1,4-cyclohexanebismethylamine | 6.7 |
| 7 | p-Xylylenediamine | 6.6 |
| 8 | Hexamethylenediamine | 6.2 |
| 9 | m-Xylylenediamine | 6.6 |

FIBER PROPERTIES OF POLYMERS PREPARED FROM 1,4-CYCLOHEXANEBIS(METHYLISOCYANATE) FIBERS BOILED 1 HOUR IN WATER

| Example | Tenacity, g./d. | Elongation, percent | Elastic recovery, percent, from 400% | Power,a g./d. | Return b power, g./d. | Permanent set, percent after— | |
|---|---|---|---|---|---|---|---|
| | | | | | | 1 min. | 60 min. |
| 6 | 0.45 | 630 | 98.5 | 0.198 | .020 | 8 | 5.5 |
| 7 | 0.53 | 580 | 98.3 | 0.271 | .021 | 10 | 6 |
| 8 | 0.60 | 605 | 98.5 | 0.311 | .023 | 11 | 5 |
| 9 | 0.48 | 590 | 98.0 | 0.287 | .022 | 10 | 5.5 | a At 400% extension, second cycle.
b At 100% extension during return from 200% extension (second cycle).
NOTE.—See definitions of physical characteristics given hereinabove.

Films cast from the polyether/urethane/urea polymers prepared from functionally aliphatic diisocyanates and functionally aliphatic diamines shown unusual stability to atmospheric gas fading or yellowing as compared to films from polyether/urethane/urea polymers prepared from functionally aromatic diisocyanates, and functionally aromatic diamines. Various films are tested in a gas Fade-Ometer, described in the 1962 technical manual of the A.A.T.C.C., volume XXXVIII, and show no yellowing after 85 hours in some cases. A film cast from a polymer made from a copolyether glycol, 4,4'diphenylmethane diisocyanate and 4,4' - diphenylmethanediamine yellows in 6 hours. A film cast from a polymer made from poly-(tetramethylene oxide) glycol (PTMG), 4,4' - diphenylmethane diisocyanate, and chain extended with water yellows in less than 18 hours. A film cast from a polymer prepared from a copolyether glycol, hexamethylenediisocyanate, and 4,4'-diphenylmethanediamine yellows in 6 hours. Therefore, it appears that whenever the polymer has a

attached directly to an aromatic ring, the formation of a yellow color in the polymer is a serious problem. The yellowing can be unexpectedly eliminated by using diamines and diisocyanates in which the amino and isocyanato groups are attached to aliphatic carbon atoms according to the present invention without sacrificing advantageous combinations of other important characteristics.

Aliphatic diisocyanates are generally much less reactive than aromatic ones. Consequently, the reaction between the poly-(ether glycol) and aliphatic diisocyanate is difficult to drive to completion. The use of catalyst systems such as triethylenediamine with dibutyltin dilaurate has provided a means of effecting complete reaction between aliphatic diisocyanates and poly(ether glycols) without the use of excessive heat.

It has been found according to this Case AC that the preparation of polyether urethane elastomers from functionally aliphatic diamines and/or functionally aliphatic diisocyanates presents more numerous difficulties than when aromatic diisocyanates and aromatic diamines are used. Aliphatic diamines are much more basic by nature than aromatic diamines and tend to produce insoluble gels. The polymer remaining in solution is usable but the yield of polymer is lowered and the problem of eliminating insoluble gel is a difficult one.

Elastomers produced from copolyether glycols have better low temperature properties than those produced from simple poly(ether glycols). This is further illustrated by the following additional examples. The scope of this invention is not limited to the use of a poly(ether glycol) as the source of the soft segment. It is also contemplated that this soft segment can be prepared from a polyester prepared from an aliphatic glycol and an aliphatic dibasic acid. The choice of these components must be such that the final polyester has a melting point of less than 50–60° C. and be terminated with hydroxy groups. Dibasic acids such as adipic acid, sebacic acid, pimelic acid, thiodipropionic acid, dodecanedioic acid, oxadiacetic acid, etc., may be used. Glycols such as ethylene glycol, neopentyl glycol, butanediol-1,3, butanediol-1,4, 1,4-cyclohexanedimethanol, poly(ether glycols) of less than 500 molecular weight, etc., may be used. The final polyester should have a molecular weight of 600 to 10,000 and preferably 1000 to 4000.

EXAMPLES 9 to 13

Segmented copolymers of copoly(THF+6% OBN), p-xylylene diisocyanate and p-xylylenediamine and water The macro-diisocyanate used is based upon a copolyether of THF and 8-oxabicyclo[4.3.0]nonane (OBN) which contains 6 mole percent of OBN. This hydroxy terminated copolyether (204.8 g., mol. wt. 4450, 0.046 mole) and 17.30 g. (0.092 mole) of p-xylylene diisocyanate is stirred under nitrogen and heated at 94° C. This viscous macro-diisocyanate (60.06 g., 0.01245 mole) is dissolved in 425 ml. dry N,N-dimethylacetamide. This solution is stirred vigorously under nitrogen. A solution of 1.7 g. (0.01245 mole) of p-xylylenediamine and 0.45 g. (0.025 mole) of water in 100 ml. of N,N-dimethylacetamide is added dropwise over a twenty-five minute interval. During this addition, the temperature of the solution is gradually raised from room temperature to a final value of 60° C. during the latter half of the addition.

The viscous hot dope of polymer is immediately transferred to the preheated reservoir of a wet spinning apparatus. The dope is pumped through a 104-hole spinneret at the rate of 3 ml. per minute into a water bath heated to 60° C. The fibers are taken up at 12 ft. per minute and the final fibers, which contain 6.5 percent hard segment, are found to possess the following properties:

Tenacity (1)—0.5–0.6 g./d.
Elongation—580–600%
Elastic recovery (6)—98.2% (from 400% extension)
Power at 400% extension on first cycle (5)—0.248 g./d.
Power at 400% extension on second cycle (5)—0.258 g./d.
Power at 400% extension on first cycle after boiling fiber 1 hr. in water (5)—0.226 g./d.
Power at 400% extension on second cycle after boiling 1 hour in water (5)—0.267 g./d.
Flow point (at 0.02 g./d. load) (2)—226° C.
Return power at 100% extension after two cycles to 200% extension (5)—0.022 g./d.
Permanent set (4):
   14% at 1 min. after release
   10.5% at 60 min. after release The numbers in parentheses correspond to the numbers in the list of characteristics set forth hereinabove.

It can be seen that the power of this yarn (at 400% elongation) remains approximately constant on recycling or on treatment with boiling water.

The preparation of Example 9 is repeated using copolyethers of different molecular weights. This has the effect of varying the amount of hard segment in the elastomer. The following table summarizes the effect of this variation of composition upon the power of the fiber.

power at 400% elongation after boiling water treatment. In contrast, fibers of the composition described in the instant invention show little decrease in power after boiling in water.

In addition, a comparison of the data of Examples 1–5 of Case B shows that in general the power at 400% elongation increases as the amount of hard segment does. However, at equivalent amounts of hard segment, the 400% power of the compositions prepared from p-xylylenediamine of this Case AC is greater by approximately a factor of two than that of the compositions prepared from 2,2,4,4-tetramethylcyclobutane-1,3-diamine of Case B. Specifically, compare Example 13 of this case (7.5% hard segment, 400% power, 0.247 g./d.) with Example 22 of Case B (7.6% hard segment, 400% power, 0.095 g./d.).

Such differences in extension power indicate some fundamental difference in molecular structure. It is possible to explain these differences by assuming that the extension power of a fiber is controlled by the forces acting between the molecules. These forces resist the straightening of the molecular chains which occurs as the fiber is elongated.

Chief among these forces are the hydrogen bonds between the carbonyl of the urea or urethane group and the amino hydrogen of the same groups on neighboring molecules. If the assumption is made that these hydrogen bonds control the extension power of these elastic fibers then it is possible to explain the differences observed. The compositions of Case B are prepared from hindered diamines. This steric hindrance of the amino group of the diamine used would be expected to reduce the effectiveness of the hydrogen bonds in the final polymer. The compositions of the instant invention use non-hindered diamines and consequently enjoy the full use of their hydrogen bonds. This great contribution of the non-hindered aliphatic diamines to the effectiveness of the hard segment is not indicated in prior art. In fact, all hard segments have been considered equally effective. Despite certain advantages of the segmented copolymers of this case it should be noted that the segmented copolymers of Case B have certain valuable characteristics of great utility as is apparent in Case B, e.g., elastic recovery.

EXAMPLE 14

Segmented copolymers of copoly(THF+6% OBN), p-xylylene diisocyanate and ethylenediamine The macro-diisocyanate described in Example 9 (68.40 g., 0.0142 mole) is dissolved in 485 ml. of N,N-dimethylacetamide and the solution warmed to 42° C. To this solution, a solution of 0.86 g. ethylenediamine (0.0143 mole) and 0.52 g. (0.0289 mole) of water in 100 ml. of N,N-dimethylacetamide is added with vigorous stirring COMPOSITIONS PREPARED WITH p-XYLYLENE DIAMINE

| Example | Mol. wt. of copolyether | Weight percent of hard segment | Extension power,[a] g./d. | Return power,[b] g./d. | Return power,[c] g./d. 1 min. | Permanent set, percent after— | |
|---|---|---|---|---|---|---|---|
| | | | | | | 1 min. | 60 min. |
| 10 | 6,600 | 4.6 | 0.118 | 0.013 | 0.017 | 10 | 5 |
| 11 | 5,600 | 5.3 | 0.123 | 0.017 | 0.021 | 6.5 | 4.5 |
| 12 | 4,500 | 6.5 | 0.267 | 0.016 | 0.022 | 7.5 | 5 |
| 13 | 3,800 | 7.5 | 0.247 | 0.017 | 0.022 | (d) | (d) |

[a] Power measured at 400% extension on second cycle of extension to 400%.
[b] Return power measured at 100% extension during return from second cycle of extension to 400%.
[c] Return power measured at 100% extension during return from second cycle of extension to 200%.
[d] No measurement was made.
NOTE.—See definitions of characteristics set forth hereinabove.

A comparison of the behavior of the fiber properties on boiling for 1 hour in water is significant. Fibers of the compositions described in Case B show a marked loss in over a twenty-five minute period. The final temperature of the dope is 86° C. The final viscous dope is immediately wet spun into a water bath at 60° C. to give elastic fibers containing 5.0% hard segment. The following fiber properties are obtained:

Tenacity—0.5 g./d.
Elongation—510–585%
Elastic recovery—98.7%
Power at 400% extension (2nd cycle)—0.271 g./d.
Power at 400% extension (2nd cycle) on fiber boiled 1 hr. in water—0.275 g./d.
Return power at 100% extension after 2 cycles to 200%—0.023 g./d.
Permanent set:
  1 min.—6.5%
  60 min.—4.0%

EXAMPLE 15

Segmented copolymer of copoly(THF+6% OBN), p-xylylene diisocyanate and hexamethylenediamine The procedure of Example 14 is repeated using hexamethylenediamine in place of the ethylenediamine. The final viscous dope is wet spun into fibers which contain about 6.1% hard segment and have the following properties:

Tenacity—0.60–0.67 g./d.
Elongation—520–580%
Elastic recovery—98.2%
Power at 400% extension—0.336 g./d.
Power at 400% extension, 2nd cycle—0.362 g./d.
Power at 400% extension, 2nd cycle, fiber boiled 1 hr. in water—0.357 g./d.
Return power at 100% extension after two cycles of extension to 200%—0.025 g./d.
Permanent set:
  1 min.—10%
  60 min.—7.5%

EXAMPLE 16

Segmented copolymer of copoly(THF+6% OBN), p-xylylene diisocyanate and 1,4 - cyclohexanebis(methylamine)

The procedure of Example 14 is repeated using trans-1,4-cyclohexanebis(methylamine) in place of ethylenediamine. This composition contains about 6.6% hard segment. Fibers wet spun from the resulting dopes are found to possess excellent fiber properties, particularly insofar as power is concerned.

Peak power at 400% extension—0.315 g./d.
Peak power at 400% extension on 2nd cycle—0.380 g./d.

Return power at 100% extension after two cycles of extension to 200%—0.021 g./d.
Permanent set:
  After 1 min.—9.5%
  After 60 min.—6.5%

The preceding examples have pertained to the employment of macro-diisocyanates prepared from about 2 mole proportions of the diisocyanate for each mole proportion of the copolyether. The following examples are illustrative of the employment of those macro-diisocyanates where the oligomers are obtained using a ratio less than 2 to 1.

EXAMPLE 17

Segmented copolyester of copoly(THF+6% OBN), p-xylylene diisocyanate and p-xylylenediamine A macro-diisocyanate is prepared by heating for 4 hours at 94–95° C. under nitrogen a mixture of 8.43 g. (0.0449 mole) p-xylylene diisocyanate with 97.62 g. (0.0249 mole) of a copolyether of molecular weight 3800 prepared from a mixture of tetrahydrofuran and 6 mole percent 8-oxabicyclo[4.3.0]nonane. A determination of isocyanate end groups indicates a number average molecular weight of 5300. This macro-diisocyanate (76.30 g., 0.0144 mole) is dissolved in 560 ml. of dimethylacetamide and the solution is warmed to 40° C. A solution of 2.71 g. (0.0144 mole) of p-xylylene diamine dissolved in 100 ml. of the solvent is then added rapidly with stirring under nitrogen over a twenty-five-minute period while the temperature is allowed to increase to 68° C. The fiscal viscous dope is wet spun into a water bath at 60° C. to give fibers having about 6.1% hard segment and having the following fiber properties.

Tenacity—0.74 g./d.
Elongation—540%
Elastic recovery from 400% extension—98.1%
Power at 400% extension (2nd cycle)—0.358 g./d.
Power at 400% extension (2nd cycle) after boiling 1 hr. in water—0.320 g./d.
Return power at 100% (after 2 cycles to 200%)—0.022 g./d.
Permanent set:
  1 min.—10.5%
  60 min.—7.5%

The following tables of examples are based upon segmented copolymers prepared as described in Example 17 except for differences in the molecular weight of the copolyether and the resulting macro-diisocyanate.

MACRO-DIISOCYANATES POLYMERIZED WITH p-XYLYLENE-α,α'-DIAMINE

| Example | Polyether molecular weight | Molar ratio diisocyanate to polyether | Molecular weight of macro-diisocyanate | Weight percent hard segment |
|---|---|---|---|---|
| 18 | 1,900 | 1.45 | 4,160 | 6.5 |
| 19 | 2,300 | 1.50 | 6,000 | 6.1 |
| 20 | 3,500 | 1.64 | 7,200 | 5.3 |
| 21 | 3,800 | 1.65 | 6,000 | 5.0 |

PROPERTIES OF FIBERS AFTER BOILING 1 HR. IN WATER

| Example | Tenacity, g./d. | Elongation, percent | Percent elastic recovery from 400% extension | Extension power, g./d.[a] | Return power, g./d.[b] | Permanent set, Percent after— | |
|---|---|---|---|---|---|---|---|
| | | | | | | 1 min. | 60 min. |
| 18 | 0.50 | 640 | 95.6 | 0.318 | .023 | 21 | 14.5 |
| 19 | 0.66 | 580 | 97.4 | 0.431 | .021 | 9.5 | 7 |
| 20 | 0.79 | 585 | 98.1 | 0.507 | .017 | 101 | 67 |
| 21 | 0.46 | 650 | 98.3 | 0.220 | .021 | 7.5 | 5 |

[a] At 400% extension during second cycle.
[b] At 100% extension on return from second 200% extension.
NOTE.—See definitions of these characteristics hereinabove.

MACRO-DIISOCYANATES POLYMERIZED WITH HEXAMETHYLENEDIAMINE

| Example | Polyether molecular weight | Molar ratio diisocyanate to polyether | Molecular weight of macro-diisocyanate | Weight percent hard segment in polymer |
|---|---|---|---|---|
| 22 | 2,300 | 1.5 | 5,500 | 5.8 |
| 23 | 3,000 | 1.7 | 4,750 | 6.3 |
| 24 | 3,000 | 1.6 | 5,600 | 5.4 |

PROPERTIES OF FIBERS AFTER BOILING 1 HR. IN WATER

| Example | Tenacity, g./d. | Elongation, percent | Percent elastic recovery from 400% extension | Extension power, g./d.[a] | Return power, g./d.[b] | Permanent set, Percent after— | |
|---|---|---|---|---|---|---|---|
| | | | | | | 1 min. | 60 min. |
| 22 | 0.69 | 542 | 97.1 | 0.497 | .025 | 9 | 7 |
| 23 | 0.57 | 580 | 96.9 | 0.379 | .028 | 13.5 | 10 |
| 24 | 0.53 | 548 | 97.2 | 0.360 | .030 | 12 | 8.5 |

[a] At 400% extension during second cycle.
[b] At 100% extension on return from second 200% extension.
NOTE.—See definitions of these characteristics hereinabove.

Particular attention is drawn to Example 20. It is to be noted that the permanent set of this material is very high. This is due to the presence of poly(tetramethylene glycol) in the elastomer rather than the copolyether. Poly(tetramethylene glycol) of molecular weight greater than 2500 has the disadvantage of producing a fiber with a relatively high degree of permanent set. This set is caused by the polyether segments of the elastomer molecule tending to crystallize after they are oriented by the stretching applied in the permanent set test. Employment of copoly(THF+OBN) according to one aspect of this invention effectively reduces this tendency of the polyether segment to crystallize and so eliminates the high permanent set. Such a modifying effect in various degrees can also be obtained when copoly(THF+OBN) is admixed with various weight proportions of poly(tetramethylene glycol).

From the examples presented above, it can be seen that elastomeric fibers of excellent elastic properties can be obtained from compositions containing considerably less than 10 percent hard segment. For the most part, these compositions contain less than 8 percent hard segment since it is quite difficult to prepare compositions containing even this large an amount of hard segment.

It has been pointed out that the method for preparing these segmented copolymers advantageously employs temperatures of about 75 to 150° C. In some instances when the prepared dopes are cooled to room temperature, they rapidly set to a gel, and this can be avoided by employing the process of Case G. Also, if compositions containing 8–10 percent hard segments are prepared, they possess a marked tendency to gel even at the elevated temperatures. Specifically, the dope of Example 13 (7.5 percent hard segment) was found to wet spin at 80° C. for only 20 minutes due to gelation difficulties. While this provided sufficient fiber for testing purposes, the situation is one that would be difficult from a commercial production viewpoint; however, this can be overcome by using the process of Case G.

Most advantageous solubility characteristics can be effected in the subject compositions by preparing oligomers of the polyether during macro-diisocyanate preparation or by the use of unsymmetrical diamines which provide more soluble hard segments. However, even with these variations, it has not been found to be possible to go above 9 percent hard segment and obtain dopes which can be feasibly spun. See examples below.

It can be seen, therefore, that there is a definite advantage with compositions of the instant invention in preparing those with substantially less than 10 percent and preferably less than 8 percent hard segment. It is in this range that the compositions are readily prepared and spun and have an excellent balance of elastic properties.

EXAMPLE 25

Segmented copolymer of copoly(THF+6% OBN) p-xylylene diisocyanate and water

A macro-diisocyanate is prepared in a one-liter, 3-necked flask equipped with a stainless steel stirrer into which there is charged 56.0 g. (0.298 mole) p-xylylene diisocyanate, 750 g. (0.145 mole) of a dry copolymer of tetrahydrofuran with 6 mole percent of 8-oxabicyclo-[4.3.0]nonane (molecular weight about 5180). The mixture is heated with agitation at 90° C. for two hours under dry nitrogen. This product constitutes the macro-diisocyanate of which 200 g. is introduced into a two-liter flask equipped with a stainless steel agitator and there is also introduced 1,000 ml. of dry distilled dimethylacetamide and 3.45 g. of demineralized water. The solution is agitated and heated at 75° C. for seven hours at which time the viscosity of the solution is 4,500 centipoises at 26° C. This solution is spun promptly into a coagulating bath whereby excellent elastomeric fibers were produced.

Water can also be employed in a similar manner for chain-extending other macro-diisocyanates which are prepared by reacting one mole equivalent of a polymer of tetramethylene glycol or copolymers of tetrahydrofuran and 8-oxabicyclo[3.2.0]nonane (4–25 mole percent) with two mole equivalents of p-xylylene diisocyanate. The macro-diisocyanate is then dissolved in a suitable amount of a solvent such as dimethylformamide or dimethylacetamide to which enough water is added to react with all of the remaining unreacted isocyanate groups, generally at least 5 times as many moles as theoretically required as explained above.

The reaction with water is advantageously accelerated by heating. This can also be achieved by the addition of a catalyst, e.g. dibutyltin dilaurate, but it is generally preferred not to use a catalyst. As the reaction progresses, the viscosity of the solution increases. When the desired inherent viscosity is reached, the reaction can be slowed by cooling the solution. The solution should be spun promptly unless measures are taken to improve its stability.

EXAMPLE 26

Segmented copolymer of poly(THF+6% OBN), m-xylylene diisocyanate and m-xylylenediamine A macro-diisocyanate is prepared from poly(THF+6 percent OBN) having a molecular weight of 4100 which is reacted with 2 mole proportions of m-xylylene diisocyanate. The product, 33.4 grams, is extracted three times with 3 ml. of acetonitrile per gram of product. This macro-diisocyanate is then made up to a solution in 156 ml. of N,N-dimethylacetamide including about 34 ml. of acetonitrile. The solution is stirred and heated at 49° C. under nitrogen while adding dropwise over 15 min. 0.4 g. m-xylylenediamine. The viscous dope is stabilized with 0.5 ml. of acetic anhydride and has a viscosity of 920 poises at 32° C. It is wet spun into water heated to 60° C. The resulting elastic fiber has a tenacity of 0.29 to 0.35 g./den., elongation 350–473 percent and 97.2 percent elastic recovery from 400% elongation.

Other examples using m-xylylene diisocyanate and other diamines and/or water can be prepared as described hereinabove.

EXAMPLE 27

This example uses poly(tetramethylene glycol), p-xylylene diisocyanate and 1,4-cyclohexanebis(methylamine).

An isocyanate terminated polyether (prepolymer) is prepared in 116.37 g. of toluene by reacting 637 g. of an anhydrous 2000 molecular weight poly(tetramethylene glycol) with 85.63 g. of p-xylylene diisocyanate at 94–103° C. for 2 hours and 28 minutes with stirring under nitrogen. To retard catalytic action of trace impurities (see Davis et al. Ser. No. 656,770 filed July 28, 1967), now U.S. Pat. 3,506,620, issued Apr. 14, 1970, 0.108 g. of acetylacetone is used in the prepolymer preparation. The prepolymer is extracted 3 times using 3 ml. of anhydrous acetonitrile per gram of prepolymer for each extraction. The extraction process is further described in U.S. patent application Ser. No. 378,711 (Case G). After extraction residual acetonitrile remaining in the prepolymer is removed by distillation at reduced pressure and the prepolymer is dissolved in methylene chloride. The extracted undiluted prepolymer has a diisocyanate content of 2.14 percent based on p-xylene diisocyanate.

A sample of the prepolymer (258 g. in methylene chloride) is further diluted with methylene chloride containing 2.62 g. of pentaerythritol tetrastearate and tert-butylalcohol (see Caldwell et al. Ser. No. 656,644 filed on July 28, 1967) now abandoned and chain extended with about 3.82 g. of high trans 1,4-cyclohexanebis(methylamine) dissolved in 522 ml. of a solvent consisting of 90 percent by weight tert-butylalcohol and 10 percent by weight of methylene chloride. The chain extension is carried out over a period of 23 minutes with rapid stirring of the prepolymer solution. A viscous dope is formed. Near the end of chain extension 2.62 g. of dilauryl 3,3'-thiodipropionate, 5.24 g. of 2,6-didodecyl-p-cresol, 5.24 g. of bis(cyclic 2,2-dimethyltrimethylene) 1,4-cyclohexylenedimethylene phosphite, 5.24 g. of polydimethylaminoethyl methacrylate and 10.5 g. of $TiO_2$ (in slurry form) are mixed with the dope. After chain extension is complete, 0.026 g. of acetylacetone and 1.3 ml. of acetic anhydride (as dope viscosity stabilizer) are mixed with the dope. The final dope contains 14 percent by weight polymer solids based on the weight of polymer and solvent and the final dope solvent consists of 65 percent by weight of methylene chloride and 35 percent by weight of tert-butylalcohol.

The dope is spun into elastomeric fiber by dry spinning. After aging one week at about 60 percent relative humidity and about 23° C. the fiber has 97.8 percent elastic recovery from 400 percent extension, 0.74 g./den. tenacity and an elongation of 580 percent.

EXAMPLE 28

This example uses a mixture of poly(tetramethylene glycol) and 8-oxabicyclo[4.3.0]nonane modified poly-(tetramethylene glycol, p-xylylene diisocyanate and 1,4-cyclohexanebis(methylamine).

Three mole parts of a 2000 molecular weight polytetramethylene glycol is blended with 1 mole part of a copolyether glycol prepared from tetrahydrofuran and 8-oxabicyclo[4.3.0]. The copolyether glycol contains 8 mole percent of the units derived from the nonane; therefore, the blend contains 2 mole percent of the units derived from the nonane.

An elastomeric fiber is prepared, using the glycol blend, by a procedure similar to that used in Example 27. With the exception of the glycol, the same reagents are used as in Example 27. After spinning and aging the fiber has an elastic recovery of 97.9 percent from 400 percent extension, tenacity of 0.66 g./den., elongation of 590 percent and a flow point of 211° C.

FIG. 1 of the drawings provides representative curves illustrating the effect of 1,2-cyclohexylenedimethyleneoxy units (designated OBN) in blends with poly(tetramethylene glycol), abbreviated PTMG, on the percent permanent set at various temperatures of spandex polymers derived from a polymeric glycol, p-xylylenediisocyanate, and 1,4-cyclohexanebis(methylamine), as illustrated by Examples 27 and 28. The polymeric glycols have molecular weights of about 2,000. A very surprisingly great improvement is observed with only 2 percent OBN as shown in FIG. 1. This is quite important in wearing apparel made from spandex fibers.

As is disclosed in this application and in the above-identified series of related cases, one aspect of this invention relates to a method for improving physical properties of the spandex fibers manufactured from the spandex polymers defined herein and in Case B by subjecting the fully formed fibers to a post-formation treatment.

As is evident hereinabove the percent of chain extension is equal to 100 times the mole ratio of reacted diamine and/or reacted water to macro-diisocyanate which can also be called prepolymer, the prepolymer being in effect, a substantially linear polymer having an isocyanate group at each end as defined above.

Because the spandex prepolymer is normally chain extended while in a suitable solvent medium, the spandex dope so formed may then be spun, by either wet or dry spinning techniques, into textile fibers, or extruded into sheeting materials, or cast into coatings, and so forth, of the spandex polymer.

However, because of the chemistry and unique nature of well known spandex type polymers and solutions or dopes, certain processing difficulties are encountered in transforming spandex polymers, when they are formed as substantially 100 percent chain extended polymers, to end product form. For example, one of the major problems encountered in producing textile fibers arises during the actual extruding or spinning, through suitable spinneret orifices, of the substantially completely chain extended polymer, from dope form into fiber form.

It has been found that a prime factor in determining the spinnability and processability of a given spandex solution or dope is that of inherent viscosity, which is abbreviated as I.V. It has been found that the inherent viscosity of the polymer in the spandex dope is directly related to the molecular weight of the spandex polymer. By inherent viscosity, for the purposes of this application, is meant a parameter that is used as a measure of the degree of polymerization of the spandex polymer, and is calculated from the equation:

$$I.V. = \frac{\ln N_r}{C}$$

where $N_r$ is the ratio of the viscosity at 25° C. of a dilute solution, for example, approximately 0.10 percent by weight, of the spandex polymer in a solvent composed of 60 percent by weight of phenol and 40 percent by weight of tetrachloroethane, to the viscosity of the solvent itself, and C is the concentration of the polymer in grams per 100 cc. of the solution.

For example, the higher the molecular weight and the I.V. of the spandex polymer, that is, the greater its percent chain extension, the less will be the amount of spandex polymer that can be dissolved in a given spinning solvent and yet maintain a given spinning dope viscosity. On the other hand, the lower the molecular weight of the spandex polymer, that is, the less its percent chain extension, the greater will be the amount of the spandex polymer material that can be accepted by the spinning solvent and yet maintain the same dope viscosity. In practice, a spandex dope containing polymer an I.V. of about 3.0 to 5.0 at a given concentration, is quite advantageous as it possesses good processability characteristics. A dope of a polymer with an I.V. of 6.0 to 7.0 is generally so viscous, at a similar concentration, that it is undesirably difficult to spin. On the other hand, a dope of a polymer with an I.V. of about 3.0 or less is generally not desirable either, at a similar concentration, because it is too thin for most advantageous fiber spinning.

As a general rule, it is desirable to utilize a spandex polymer having moderately high I.V. or molecular weight because the higher the I.V. or molecular weight of the spandex polymer the more advantageous will be the spandex products' physical properties such as, for example, tenacity, elongation, power, elastic recovery, permanent set, and the like. Thus, it is preferable when spinning or extruding a spandex dope to utilize a spandex polymer in solution wherein the polymer has been substantially 100 percent chain extended, that is, where substantially all of the isocyanate groups on the prepolymer have been reacted with the chain extender to produce a polymer having the maximum molecular weight that is feasible.

However, in commercial practice it is not economically feasible to spin or extrude some types of spandex dopes that contain completely chain extended spandex polymers. This is because the viscosity of such a spandex dope is too high, when a reasonable amount of solvent is used, for commercially advantageous spinning and extruding techniques. That is, there is no commercial equipment presently available of which we are aware, for spinning or extruding spandex dopes having extremely high viscosities.

On solution to the problem is to utilize a dope wherein the concentration of the spandex polymer is greatly reduced. However, this solution is not advantageous from an economic standpoint because a large amount of solvent recovery is necessitated.

This aspect of the invention is partially based on the concept that it is possible to use dopes wherein the spandex polymer is less than 100 percent chain extended in the spinning or extruding of spandex products. This is to say, it is possible to spin or extrude spandex dopes where less than the stoichiometric amount of chain extender has been added to the prepolymer, thereby creating a spandex dope comprising a spandex polymer material that is less than 100 percent chain extended. Such a spandex polymer has an inherent viscosity (I.V.) of a sufficiently low magnitude to permit the practical spinning and extruding of spandex products therefrom. For example, less than 100 percent chain extended spandex polymers may be spun or extruded by using known dope solvent systems, in practical amounts, and relatively low spinning pressures while retaining good processability. However, it has been found that the spinning or extruding of products from a less than 100 percent chain extended spandex polymer, in dope form, produces products having substantially lower end product physical properties than products formed from other types of spandex dopes wherein the spandex polymer has been substantially completely chain extended.

Thus, this aspect of the invention is in part based on the concept that certain end product physical properties of fully formed spandex products made from a spandex dope that comprises a spandex polymer which is less than 100 percent chain extended may be increased by exposing the fully formed product to a water medium in either the liquid or gaseous state.

In utilizing the method of this aspect of the invention, a spandex dope is first created wherein the spandex polymer is less than 100 percent chain extended. The spandex polymer dope is formed generally as before described, but less than a stoichiometric amount of chain extender is used to transform the prepolymer into spandex polymer form. Thus, the range for amount of chain extender that may be used in forming spandex polymers useful with this invention is between about 70 percent and about 98 percent of the stoichiometric amount required. The polymers so produced will have an acceptable inherent viscosity from the spinning or extruding standpoint. However, it is preferred, for the purposes of this aspect of the invention, to maintain the chain extension of the spandex polymer in the range of between about 85 percent and about 95 percent. Such chain extension percentages may, for example, give dopes having a polymer inherent viscosity of between about 3.7 to about 4.5. When a commercially practical amount of solvent is used, a dope having a polymer inherent viscosity within the range just stated will have a reasonable dope viscosity and good processability, and is most useful from a commercial or practical standpoint to produce acceptable end products.

In the manufacture of spandex fibers, the spandex dope supply, wherein the spandex polymer is less than 100 percent chain extended, is spun or extruded through a spinneret plate having a plurality of spinning orifices, as is the general practice in the industry. The spandex dope is forced through the spinneret orifices under pressure and exists from the spinning head either into a hot gaseous medium, i.e., dry spinning, or into a liquid medium, i.e., wet spinning. Both the liquid and gaseous mediums tend to serve the same purpose, namely, the curing of the spandex fibers to provide them with sufficient body integrity. Subsequently, the fibers may be subjected to further downstream treating steps for enhancing their physical properties and commercial attributes. For example, the spandex fibers may be subjected to a heat treating step whereby they are simultaneously stretched and heated at an elevated temperature to increase their physical properties. Also, the plurality of fibers may be coalesced together to form an integral yarn strand for the purpose of adding to the commercial desirability.

After the spandex multifilament yarn has been formed by the above described steps, and when a less than 100 percent chain extended spandex polymer has been utilized in creating the dope supply, the yarn is then exposed to a water medium, thereby increasing its end product physical properties, and attaining a physical property level heretofore unattainable.

It is hypothesized that the increase in end product physical properties arises from a further chain extension of the spandex polymer molecule system. The chain extension, of course, constitutes a further chemical reaction within the spandex polymer and proceeds essentially as follows:

(1) 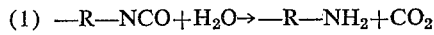

wherein R represents the spandex polymer and contains ether, urethane, and urea groups. Thus, the initial reaction between the water and the isocyanate capped polymer, that is, the less than 100 percent chain extended polymer, creates an amine radical in place of the isocyanate radical and gives off carbon dioxide. The amine formed from this initial reaction then reacts with another isocyanate radical to produce a urea linkage, thereby giving the desired chain extension of the spandex polymer:

(2) 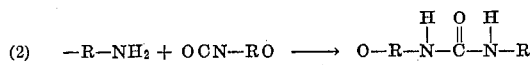

It has been found, however, that control of these chemical reactions is quite necessary in order to obtain maximum end product physical properties. For example, unless the water is present in a sufficient amount the first reaction will not take place. On the other hand, if water is exposed to the fully formed product at too high an activity level, for example, in the form of super-heated steam, the initial reaction will occur too rapidly, thereby creating too many amine radicals and leaving too few isocyanate radicals to take part in the second or coupling reaction.

The preferred method of this invention includes exposing the spandex product, for example, fibers in either loose or packaged form, to a controlled water vapor atmosphere having a relative humidity of between about 40 percent and about 75 percent and a temperature between about 20° C. and about 75° C. for a time sufficient to permit maximum physical properties of the product to be attained. However, higher or lower relative humidity levels, for example, 5 percent to 100 percent, at higher or lower temperatures, for example about 0° C. to about 100° C., may be used to accomplish the objectives of this invention. Relative humidity levels below about 5 percent are generally impractical as not a sufficient amount of water is present to generate the desired physical properties increase within a reasonable time.

From a practical standpoint, the preferred exposure criteria may be accomplished by storage of the end product packages in storage rooms under a controlled atmosphere. Of course, the higher the relative humidity and the higher the temperature in the storage room, within the prescribed limits, the faster will the desired results on the spandex product be completed without adverse effects arising. For example, storage of spandex yarn packages in a controlled atmosphere room having a relative humidity of about 60 percent to about 75 percent at a temperature of about 40° C. would generally achieve the desired results in about three to four days. Upon completion of the post-formation treatment with water, the tensile properties of the yarn will have ceased to change and the spandex yarn will be ready for use in elastic textile products.

Alternatively, the spandex product may be exposed to a steam atmosphere or exposed to a liquid water bath until the maximum tensile properties are achieved. In this case, the higher the temperature of the water bath, for example, the shorter will be the residence time required of the product therein to reach the desired results. When using a water bath it is preferred that the water be between about 10° C. and about 50° C. although temperatures between about 1° C. and about 100° C. may be used. When using steam it has been found that only saturated steam at atmospheric pressures or a little higher, for example, about 0 to 15 p.s.i.g., are useful.

As mentioned, the exposing of the fully formed product of water may be carried out prior to wind up on its end product packages, that is, during its initial manufacture. However, when the product is treated during its initial manufacture it is obvious that a water vapor atmosphere cannot be used, because of time limitations, but a water bath or saturated steam atmosphere must be employed. Alternatively, the treating of the spandex product also may be carried out after it has been wound on its end product package. The mere fact that many windings are present on a product package such as, for example, in the case of fibers, does not appear to affect or limit the action of the water vapor, liquid water, or steam on the innermost windings as it has been found that they are fully equal in terms of end product properties as the outermost windings of any given yarn package.

The process of this aspect of the invention is further illustrated by means of the following examples.

EXAMPLE 29

A spandex polymer is prepared from a polyester glycol and an excess of p-xylylene diisocyanate. An amount of the prepolymer equal to 136 gm. is dissolved in 1,355 ml. of N,N'-dimethylacetamide. Water, in an amount of 8.15 ml., is added to the prepolymer solution to effect chain extension. The spandex polymer so formed is approximately 88 percent chain extended. The spandex solution or dope is then heated at 75° C. for about 6.5 hr. to obtain a good spinning viscosity, the polymer having an I.V. of 4.2. The spandex polymer utilized in this example is more explicity set forth hereinabove.

Fibers are then spun from the spandex dope, by the wet spinning method, into a water bath. Control fibers are prepared by spinning a portion of the dope into a water bath containing 3 percent dimethylamine; the dimethylamine reacts with the unreacted isocyanate groups on the polymer to prevent any change in the physical properties of the spun fibers.

The fiber samples are exposed to a controlled atmosphere of 21° C. and 65 percent relative humidity.

The table below sets forth fiber physical properties, as defined above, after the fibers are exposed to the controlled atmosphere for one day and eight days.

| Physical properties | After one day | | After eight days | |
|---|---|---|---|---|
| | Treated | Control | Treated | Control |
| Tenacity, g./d | 0.54 | 0.42 | 0.60 | 0.35 |
| Elongation, percent | 632 | 595 | 617 | 637 |
| Return power, g./d.[a] | .015 | .011 | .016 | .011 |
| Permanent set, percent after 60 min | 11.2 | 13.0 | 4.8 | 12.0 |

[a] Return power measured at 100% extension during return from second cycle of extension to 400%.

NOTE.—In the first paragraph of the description of "Second Process Operation" set forth hereinabove, reference is also made to curing fibers in contact with air having significant relative humidity.

A controlled water vapor atmosphere, regardless of the carrier gas, greatly improves the physical properties of less than 100 percent chain extended spandex polymer fibers. On the other hand, fibers exposed to dry atmospheres do not show an increase in end product physical properties.

Immersion of the fibers in a water bath is operative under the concept of this aspect of the invention, but exposure of the fibers at either 65 or 90 percent relative humidity is preferred to immersion in water. However, either a water bath or controlled atmospheric conditions are preferable to lack of exposure to a water medium.

EXAMPLE 30

A copolyether glycol of 4,000 molecular weight is prepared from tetrahydrofuran and 8-oxabicyclo[4.3.0] nonane, the glycol containing 7.1 percent of said nonane, by a procedure described in U.S. application Ser. No. 231,588, assigned to the assignee of this application. The glycol is then dissolved in cyclohexane and extracted three times with a mixture of 75 percent methanol and 25 percent water to extract low molecular weight polymer molecules. After extraction the glycol has a molecular weight of about 4,700.

A prepolymer is then prepared by reacting the copolyether glycol, which contains 150 p.p.m. of acetylacetone (based on the weight of the glycol) to retard catalytic action of trace impurities, with p-xylylene diisocyanate in the mole ratio of about 1:2.2, respectively. Unreacted p-xylylene diisocyanate is stripped in a thin film evaporator by the procedure described in U.S. application Ser. No. 378,711, (Case G) also assigned to the assignee of this application. The stripped prepolymer has an analysis of 2.30 percent diisocyanate, calculated as p-xylene diisocyanate.

The prepolymer, in an amount of 278.0 gm., is then dissolved in 1,057 gm. of methylene chloride. The prepolymer is chain extended with 1,4-cyclohexanebis(methylamine). The spandex polymer so formed is found to be approximately 88 percent chain extended, and the dope has an I.V. of 4.14.

The spandex dope is then spun into fibers. The fibers are tested as follows: (a) fibers are tested immediately after spinning, and (b) fibers are exposed to a saturated steam atmosphere for 10 minutes within less than three hours after spinning, the steam having been generated at 10 p.s.i.g., and the fibers are then tested within the same three hour period.

The physical properties of the control and treated fibers are tabulated below.

| Physical properties | As spun | Steam |
|---|---|---|
| Tenacity, g./den | 0.52 | 0.68 |
| Elongation, percent | 750 | 685 |
| Return power, g./den.[a] | .017 | .019 |
| Flow point, ° C.[b] | 182 | 206 |

[a] Return power measured at 100% extension during return from second cycle of extension to 200%.
[b] Flow point is defined in Davis et al. Serial No. 677,056 filed October 23, 1967.

See Examples 9, 14, 15 and 17 hereinabove for treatment with boiling water which is, in effect, a combination of hot water at 100° C. and steam.

It is apparent that this aspect of the invention provides a process for manufacturing spandex fibers, having a segmented copolymer composition as described above, comprising the steps of creating segmented copolymer solution wherein said copolymer is less than 100 percent chain extended, spinning said solution into a fiber, and exposing said fiber to a water medium.

The following comparative examples will serve to show the unobvious advantages of this invention with respect to employing a functionally aromatic diisocyanate and/or diamine instead of those specified by this invention.

EXAMPLES A, B AND C

Segmented copolymers of copoly(THF+6–8% OBN), p,p'-methylenediphenyl diisocyanate and p,p'-diaminodiphenylmethane For purposes of comparison with the elastomeric compositions described in U.S. 2,929,804, Example IV of that patent is repeated. However, instead of using poly(tetramethylene glycol) as the example of this patent describes, the preparations are carried out with the copolyether prepared from tetrahydrofuran and 8-oxabicyclo[4.3.0]nonane and containing 6–8 percent of the latter component. This is done in order to provide an exact comparison between the compositions of some of the above examples of the subject invention and those of U.S. 2,929,804. Each composition is wet spun and the fiber properties are measured. The following table presents a summary of the results obtained.

Data for comparison from Examples A–C and 10–13 is presented in the following table.

| Example | Glycol Molecular weight | Glycol Mole percent OBN | Diisocyanate | Chain extender | Weight percent of hard segment | Return power,[a] g./d. | Permanent set, percent after— 1 min. | Permanent set, percent after— 60 min. |
|---|---|---|---|---|---|---|---|---|
| 10 | 6,600 | 12.5 | p-Xylylene | p-Xylylene-diamine and water | 4.6 | .013 | 10.0 | 5.0 |
| 11 | 5,600 | 11.5 | ...do... | ...do... | 5.3 | .017 | 6.5 | 4.5 |
| 12 | 4,500 | 8 | ...do... | ...do... | 6.5 | .016 | 7.5 | 5.0 |
| 13 | 3,800 | 6.1 | ...do... | ...do... | 7.5 | .017 | (b) | (b) |
| C | 5,300 | 11.6 | 4,4'-diphenyl-methane | 4,4'-diphenyl-methane diamine | 7.5 | .011 | 28.5 | 17.0 |
| B | 3,680 | 7 | ...do... | ...do... | 10.2 | .011 | 23.0 | 14.5 |
| A | 1,930 | 6 | ...do... | ...do... | 17.0 | .010 | 46.0 | 33.0 |

[a] Return power measured at 100% extension during return from second cycle of extension to 400%; advantageously this is at least about 0.015 gram/denier according to preferred examples of the present invention.

[b] No measurement was made; however, permanent set according to preferred examples of the present invention is advantageously no more than about 10% after 60 minutes at about 24° C.

NOTE.—The definitions of these characteristics are given hereinabove.

| Example | Molecular weight of copolyether | Weight percent hard segment | Fiber properties Tenacity, g./d. | Elongation, percent | Elastic recovery, percent | Extension power,[a] g./d. |
|---|---|---|---|---|---|---|
| A | 1,930 | 17.0 | 0.56 | 500 | 96.3 | 0.280 |
| B | 3,680 | 10.2 | 0.28 | 640 | 97.7 | 0.095 |
| C | 5,300 | 7.5 | 0.34 | 800 | 97.8 | 0.080 |

[a] Power measured at 400% extension on second cycle of extension to 400%.

NOTE.—See definitions of characteristics given hereinabove.

A comparison of the second cycle power at 400 percent elongation obtained in the above Examples A, B and C with the corresponding data of Examples 9–13 shows that the two materials possess markedly different properties. For example, a comparison of Example 13 (7.5 percent hard segment) with Example C (7.5 percent hard segment) shows that the material of the former example has more power by a factor of approximately three than the material of the latter composition. Indeed, the composition of Example 13 with 7.5 percent hard segment is approximately equivalent to that of Example A with 17.0 percent hard segment insofar as the power at 400 percent elongation is concerned.

It is surprising that this marked difference in 400 percent power is observed since there is no obvious reason why the effectiveness of hydrogen bonding should be reduced. This appears to indicate a novel and unexpected difference in molecular structure between the compositions of U.S. 2,929,804 and those of the instant invention.

EXAMPLE D

Segmented copolymer of polytetramethylene glycol, p,p'-methylenediphenyl diisocyanate and p,p' - diaminodiphenylmethane In the manner described in Example IV of U.S. Pat. No. 2,929,804, the following work is performed:

A macro glycol (50 grams which is 0.05 mole) of poly-(tetramethylene glycol) with a molecular weight of 1,000 is heated with 25 grams (0.1 mole) of p,p'-methylenediphenylisocyanate (mol. wt. is 250) with stirring for one hour at 85–86° C. to provide a polyether with isocyanate ends. This product is dissolved in 160 grams of N,N-dimethylacetamide and the solution cooled in an ice bath to 0.5° C. To this is added with stirring 10 grams (0.05 mole) of p,p'-diaminodiphenylmethane (mol. wt. is 198) dissolved in 100 grams of N,N-dimethylacetamide. The ice bath is removed and the reaction mixture is stirred rapidly while allowing it to warm up to room temperature. The polymer solution obtained is extruded through a 10-hole spinneret into a water bath at 60°–70° C. and the filaments are wound up at the rate of 20–21 feet/minute. The fibers have the following properties: tenacity=0.61 and flow point of 222° C. The weight percentage of hard segment stated in said U.S. Pat. 2,929,804 is said to be about 20 percent.

EXAMPLE E

Segmented copolymer of polytetramethyleneglycol, hexamethylene diisocyanate and p,p'-xylylenediamine The experimental work described in Example D above is also performed in the same manner except for substitution of the following reagents:

(a) 16.8 grams (0.1 mole) hexamethylenediisocyanate (mol. wt. is 168) instead of p,p'-methylenediphenylisocyanate (b) 6.80 grams (0.05 mole) p-xylylenediamine (mol. wt. is 136) instead of p,p'-diaminophenylmethane The same macro glycol and solvent in the same amounts are used as in Example D above. However, when the solution of p-xylylenediamine in N,N-dimethylacetamide is added and then stirred as described in Example D the product which forms in about 10 seconds is not a solution but is a mixture of solvent and a white precipitate. Warming to room temperature does not dissolve the precipitate. It is obviously incapable of being spun into fibers. This material is formed into as uniform a layer as possible on a glass plate. After the solvent has evaporated, a flaky nonelastic substance remains on the glass plate. The weight percentage of hard segment is calculated to be about 20 percent.

Example E shows that the prior art teaching illustrated by Example D cannot be used to produce the spandex polymers and fibers of the present invention.

EXAMPLES F-K

In order to compare the effect of the weight percent hard segment, when using functionally aliphatic non-hindered diisocyanates and aliphatic non-hindered diamines, polymers containing from about 5 percent to 25 percent by weight of hard segment are prepared and the dope stability at each level of hard segment is determined.

The prepolymers are prepared from 1000 molecular weight poly(tetramethylene glycol) and hexamethylene diisocyanate and chain extended with hexamethylenediamine in one series and p-xylylenediamine in another series of preparations. Prepolymer preparation is carried out by reacting the polymeric glycol and hexamethylene diisocyanate in the presence of 0.1 percent dibutyltin dilaurate (based on prepolymer weight) as catalyst. The catalyst is used in order to reduce the time required for the glycol-diisocyanate reaction. The glycol, diisocyanate and catalyst are combined at room temperature (about 25° C.), allowed to react for 15 to 20 minutes until the initial reaction subsides and are then heated at 85° C. for 45 minutes to 1 hour. The prepolymer is allowed to cool to room temperature and analyzed by titration for weight percent hexamethylene diisocyanate before use.

The prepolymers are chain extended with one of the designated diamines at room temperature (about 25° C.) using N,N-dimethylacetamide as the solvent. The diamine is dissolved in part of the final solvent and is added rapidly (2-3 sec.) with vigorous stirring to the prepolymer dissolved in the remainder of the solvent. The final dope contains about 15 percent by weight polymer. In each dope preparation a polymer is prepared with a calculated number average molecular weight of about 30,000.

The stability of the dope is determined by the time interval from the end of the diamine addition until the dope would not pour. When dopes are stable long enough to obtain films, inherent viscosity determinations are made on the polymer. All of the inherent viscosities are about the same value since the polymers are chain extended to the same number average molecular weight.

The table below sets forth the results which are obtained from the work described in the preceding paragraphs; HDA designates hexamethylenediamine; p-XDA designates p-xylylenediamine and by "Dope Stability" is meant the elapsed time, following the addition of the diamine, after which the dope becomes gelled to a nonpourable state.

The above table shows the results of the effect of the weight percent hard segment on dope stability. The small differences in weight percent hard segment are due to the molecular weight differences of the two diamines. The data show that as the weight percent of hard segment (urea segment) is decreased in a polymer of a given molecular weight the solubility of the polymer increased. Below about 10 percent hard segment (about 2 to 8 percent) the dopes are stable enough to be formed into elastomeric products.

Examples F, G and H are therefore illustrative of the present invention while Examples I, J and K are not claimed herein.

Polymers of the same composition as those of the above table (Examples F-K) containing about 7 percent hard segment and chain extended with hexamethylenediamine and p-xylylenediamine, are wet spun from dopes into good elastomeric fibers. The dopes containing 11.4 percent hard segment or more are not capable of being poured from the reaction vessel in which they are prepared.

According to one aspect of this invention a process is provided for spinning a fiber from a solution of the segmented copolymers as defined which have from about 2 to about 8 percent urea segments.

According to another aspect of this invention such a solution is provided which is stable against gelation for at least 5 minutes (preferably at least 45 minutes) at ambient temperatures (e.g., 15° to 35° C.) whereby spandex textile fibers can advantageously be solution spun using well known commercially useful procedures.

EXAMPLE L

Fibers from spandex polymer of this invention

A 4,274 molecular weight copolyether glycol is prepared as described in the above-identified patent application from tetrahydrofuran and 8-oxabicyclo[4.3.0]nonane and contains about 8.7 mole percent of the nonane. A prepolymer or macrodiisocyanate is prepared by reacting 700 g. of the anhydrous glycol with 70.6 g. of p-xylylene diisocyanate in 95.9 g. of toluene at 95–100° C. with stirring under nitrogen for 15 hours. The prepolymer is cooled to room temperature and unreacted p-xylylene diisocyanate is removed by extraction 3 times with 3 ml. of acetonitrile/g. of prepolymer. The extracted prepolymer has a titration analysis of 2.42 percent diisocyanate, calculated as p-xylene diisocyanate. To prepare the high molecular weight polymer capable of being formed into an elastomeric product, in this case a fiber, 260 g. of the extracted prepolymer is dissolved in 1153 g. of N,N-dimethylacetamide. To this solution is added with vigorous stirring over a period of 27 min. 4.07 g. of 1,4-cyclohexanebis-(methylamine) dissolved in 472 g. of N,N-dimethylacetamide. A smooth viscous dope is formed. The dope is wet spun by extruding at 1.3 cc./min. through a 10 hole jet, each hole being 0.13 mm. diameter, into a 40 to 70° C. water bath at about 15 ft./min. The fibers are dried at about 90–105° C. for about 9 min. and taken up on a roll at about 20–21 ft./min. The fibers are put in individual plastic bags to avoid contamination.

EFFECT OF WEIGHT PERCENT HARD SEGMENT ON SPANDEX POLYMER DOPE STABILITY

| Example | Weight percent hard segment using— | | Dope stability using— | | Polymer inherent viscosity using— | |
|---|---|---|---|---|---|---|
| | HDA | p-XDA | HDA | p-XDA | HDA | p-XDA |
| F | 4.5 | 4.8 | 27 to 42 hr | 4 to 5 days | 2.07 | 2.19 |
| G | 7.2 | 7.6 | 37 min | 61 min | 1.94 | 2.00 |
| H | 8.2 | 8.7 | 4 min | 41 min | 2.19 | 1.97 |
| I | 11.4 | 12.1 | 10 sec | 25 sec | (a) | (a) |
| J | 16.7 | 17.6 | 4 to 5 sec | 8 sec | (a) | (a) |
| K | 23.4 | 24.6 | Gelled instantly. | 2 to 3 sec | (a) | (a) | a None of these I.V. values were measured, but by calculation the I.V. values would be about 2.

EXAMPLE M

Fibers from spandex polymer of prior art

This example is a copolyurethane elastomer which is prepared according to the procedure of Example 2 of German Pat. 1,161,007. A prepolymer or macrodiisocyanate is prepared by reacting 40 g. of a 1000 molecular weight poly(tetramethylene glycol) with 20 g. of 4,4'-diphenylmethane diisocyanate for one hour with stirring under nitrogen at 83–87° C. The prepolymer is dissolved in 100 ml. of N,N-dimethylformamide and cooled to 1.5° C. in an ice bath. A solution of 2.0 g. of hydrazine monohydrate in 50 ml. of N,N-dimethylformamide is added with vigorous stirring. A viscous dope is formed. After stirring 15 min. the ice bath is removed and the dope allowed to warm to room temperature. To obtain a good spinning viscosity, the dope is diluted with 80 ml. of N,N-dimethylformamide and is wet spun by extruding at 3.0 cc./min. through a 10-hole spinneret, 0.13 mm./hole, into a 40° C. water bath. The fiber is dryed at 90–105° C. for 11 min. and wound up at 16 ft. min. The fibers are placed in individual plastic bags to avoid contamination.

Gas-fading tests are performed on fibers from the polymers of Examples L and M.

These fibers are subjected to one cycle of the gas-fading test titled "Colorfastness to Oxides of Nitrogen in the Atmosphere," Standard Test Method 23–1962, as described in the 1964 Technical Manual of the American Association of Textile Chemistry and Colorists (AATCC), vol. 40, Part IIB–73.

When fibers from polymers prepared according to Examples L and M are tested, fibers of the typical polymer composition of this invention (Example L) do not discolor in this gas-fading test while fibers of the polymer composition according to German Pat. 1,161,007 (Example M) do discolor.

Fibers from polymers prepared according to Examples L and M are subjected to a chlorine bleach. The bleach solution is prepared by mixing 4 ml. of Clorox laundry bleach which is 5.25 percent by weight sodium hypochlorite with 1000 ml. of distilled water. This solution is about 200 p.p.m. chlorine. To carry out the test, skeins of yarn are placed in separate beakers containing 600 ml. of the bleach solution at 21° C. for 16 hrs., removed, rinsed in distilled water, and are dried to room temperature (21° C.). When fibers prepared according to Examples L and M are tested, fibers of the typical polymer composition of this invention (Example L) do not discolor in this bleach test while fibers from polymers of German Pat. 1,161,007 (Example M) do discolor.

The above tests show that typical fibers of this invention are quite resistant to gas-fading and chlorine discoloration, whereas typical fibers of the prior art do discolor, probably due to the presence therein of functionally aromatic linkages as theorized hereinabove.

The curves A, B, and C in FIG. 1 illustrate the effect of OBN on the permanent set at various temperatures for elastomeric fibers according to this invention. See the discussion hereinabove following Example 28. The effect of the presence of OBN is especially valuable in order to prevent the percentage of permanent set from exceeding about 5 to 10% at any given temperature. This means that fibers represented by curve A would be useful at about 12 to 13° C. or higher, fibers represented by curve B would be useful at about 17 to 18° C. or higher and fibers represented by curve C would be useful at about 20 to 22° C. or higher. For example, if a garment were prepared from fibers represented by curve C and elongated while at about 17° C., the garment after being released would retain a high percentage of the elongation (i.e., it would have a high permanent set). The garment would return to essentially its original size only after being warmed to about 22° C. or higher. However, if fibers represented by curve A were used, the garment would return to essentially its original size after releasing from elongation at about 17° C., i.e., it would have a low permanent set.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. Elastomeric fiber of a linear segmented urea/urethane/ether copolymer having a melt temperature above 150° C. and an inherent viscosity of at least 2.0 when dissolved in a mixture consisting of 60 percent phenol and 40 percent tetrachloroethane, said copolymer containing from about 2 percent to about 8 percent by weight of said copolymers, of urea segments, essentially all of which are connected to polyether residues through urethane linkages, said urea segments containing at least one repeating unit of a polyurea having a melting point of at least 200° C. in the fiber forming molecular weight range of above about 10,000, said repeating unit being selected from the group consisting of:

(1) —A—NH—CO—NH—D—NH—CO—NH—

(2)       —A—NH—CO—NH— and (3) mixtures of (1) and (2), wherein —A— is the bivalent hydrocarbon radical of a diisocyanate having the formula: OCN—A—NCO and wherein each isocyanate radical is attached to an alpha carbon atom which is attached to three other atoms, said alpha carbon atoms are not tertiary carbon atoms, and the beta carbon atoms are not quaternary carbon atoms, and wherein —D— is the bivalent hydrocarbon radical of a diamine having the formula $H_2N$—D—$NH_2$, where in each amino radical is attached to an alpha carbon atom which is attached to three other atoms, said alpha carbon atoms are not tertiary carbon atoms, and the beta carbon atoms are not quaternary carbon atoms, essentially all of said urea segments being connected to polyether residues by urethane linkages of the formula:

—NH—CO—O— wherein the

—NH—

—CO—O— of said urethane linkage is attached to the thermal radical —A— of said urea segment and the
of said urethane linkage is attached to residues remaining after the removal of the terminal hydroxyl groups of a polyether glycol having a melting point below about 50° C,. having an average molecular weight in the range of from about 600 to about 12,000, and consisting essentially of a member selected from the group consisting of:

(A) a hydroxyl-terminated linear series of divalent —$CH_2$—$CH_2$—$CH_2$—$CH_2$— groups joined by intra-linear ether oxygen atoms, (B) oligomers of said (A) connected by from 1 to 10 intra-linear linkages having the formula:

—O—CO—NH—A—NH—CO—O— wherein —A— is defined above, (C) a hydroxyl-terminated linear series of divalent hydrocarbon groups joined by intra-linear ether oxygen atoms and having the general formula:

—($CH_2$—$CH_2$—$CH_2$—$CH_2$—O)$_m$—(G'—O)$_n$— wherein $m$ is 3 to 100 times $n$, G' is a divalent hydrocarbon group containing at least 2 carbon atoms and said hydrocarbon groups are distributed in a random manner in said linear series, (D) oligomers of said (C) connected by from 1 to 10 intra-linear linkages having the formula:

—O—CO—NH—A—NH—CO—O— wherein —A— is defined above.

(E) a mixture of glycols defined by (A) or (C), or a mixture of glycols defined by the combination of both (A) and (C), or a mixture of glycols defined by the combination of (A) or (C) or both (A) and (C) with up to 20 weight percent of the latter mixture being glycols which are hydroxyl terminated linear series of divalent G' groups having at least two carbon atoms in each G' group joined by intra-linear ether oxygen atoms, and (F) oligomers of said (E) connected by from 1 to 10 intra-linear linkages having the formula:

—O—CO—NH—A—NH—CO—O— wherein —A— is defined above, which residues include at least 1.0 mole percent of residues, calculated as mole percent of monomeric repeating unit residues in said (A), (B), (C), (D), (E) and (F) of 1,2-cyclohexylenedimethyleneoxy repeating unit residues.

2. A fiber according to claim 1 wherein said diisocyanate is hexamethylene diisocyanate and said diamine is 1,4-cyclohexanebis(methylamine).

3. A fiber according to claim 1 wherein said diisocyanate is p-xylylene diisocyanate and said diamine is 1,4-cyclohexanebis(methylamine).

4. A fiber according to claim 1 wherein said diisocyanate is 1,4-cyclohexanebis(methylisocyanate) and the said diamine is p-xylylene-α,α'-diamine.

5. A fiber according to claim 1 wherein said diisocyanate is 1,4-cyclohexanebis(methylisocyanate) and the said diamine is hexamethylenediamine.

6. A fiber according to claim 1 wherein said diisocyanate is 1,4-cyclohexanebis(methylisocyanate) and the said diamine is m-xylylene-α,α'-diamine.

7. A fiber according to claim 1 wherein the entire amount of said polyether glycols is defined by (E), which amount contains at least 1.0 mole percent of 1,2-cyclohexylenedimethyleneoxy repeating units, calculated as mole percent of monomeric repeating units in said entire amount, said fibers being characterized by having a permanent set at 0° C. of less than three-quarters that which characterizes fibers of a corresponding copolymer derived from a polyether glycol wherein the divalent groups consist essentially of the formula

—CH$_2$—CH$_2$—CH$_2$—CH$_2$—

8. A fiber according to claim 7 wherein said diisocyanate is m-xylylene diisocyanate.

9. A fiber according to claim 8 wherein said diamine is m-xylylenediamine.

10. A fiber according to claim 7 wherein said diisocyanate is p-xylylene diisocyanate.

11. A fiber according to claim 10 wherein said diamine is p-xylylenediamine.

12. A fiber according to claim 10 wherein said diamine is ethylenediamine.

13. A fiber according to claim 10 wherein said diamine is hexamethylenediamine.

14. A fiber according to claim 10 wherein said diamine is 1,4-cyclohexanebis(methylamine).

15. A fiber according to claim 1 which has a return power measured at 100 percent extension during return from a second cycle of extension to 400 percent of at least 0.015 gram/denier.

16. A fiber according to claim 15 which has a permanent set after 60 minutes at 24° C. of no more than about 10 percent.

17. A solution of said segmented copolymer defined by claim 1 which is stable against gelation for at least 5 minutes and is capable of being spun into an elastomeric textile fiber.

18. A solution according to claim 17 which has a substantially constant viscosity and is stable against gelation at ambient temperatures for at least 5 minutes.

References Cited

UNITED STATES PATENTS 2,929,804   3/1960   Steuber _____ 260—77.5

OTHER REFERENCES

Hampton et al. Oil & Color Chemists Association Journal, vol. 43, No. 2, February 1960, pp. 96, 110 and 111.

Interview with Professor Otto Bayer, PR 45246, Interview held on July 5, 1946, 8 pages.

DONALD E. CZAJA, Primary Examiner

M. J. WELSH, Assistant Examiner

U.S. Cl. X.R.

260—18TN, 30.2, 30.4N, 30.8DS, 31.2N, 32.4, 32.6N, 32.8N, 33.2R, 33.6UB, 45.95, 33.8UB, 33.4UR, 37N, 45.7EP, 45.85, 45.9R, 77.5SP; 264—178F, 184

UNITED STATES PATENT OFFICE
CERTIFICATE OF CORRECTION

PO-1050 (5/69)

Patent No. 3,597,398                    Dated August 3, 1971

Inventor(s) Burns Davis, Charles J. Kibler and James G. Smith

It is certified that error appears in the above-identified patent and that said Letters Patent are hereby corrected as shown below:

Column 7, line 14, delete "radiacls" and insert ---radicals---; Column 7, line 15, delete "carobn" and insert ---carbon---; Column 8, line 31, delete "ployurethane" and insert ---polyurethane---; Column 9, line 9, insert ---or--- before "(C)"; Column 9, line 56, after the word "stress" insert ---decay---; Column 9, line 57, delete "polymer" and insert ---copolymer---; Column 9, line 61, delete "phenyl" and insert ---phenol---; Column 10, line 8, delete "and"; Column 10, line 8, delete "X" and insert ---X'---; Column 11, lines 2 and 3, delete "conformed" and insert ---confirmed---; Column 13, line 66, delete "hydroxy" and insert ---hydroxyl---; Column 15, line 8, delete "crbon" and insert ---carbon---; Column 17, line 8, delete "p-Xylene" and insert ---p-Xylylene---; Column 17, line 60, delete "shown" and insert ---show---; Column 22, line 22, delete "fiscal" and insert ---final---; Column 28, lines 45-50, delete and insert ---

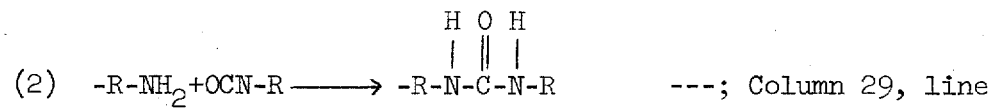

---; Column 29, line 53, delete "Polyester" and insert ---polyether---; Column 30, line 45, delete "p-xylene" and insert ---p-xylylene---; Column 32, b under the table, delete first "bout" in second line and insert ---about---. Column 35, line 23, after "fibers" insert ---prepared---; Column 36, line 45, delete "-CO-O-"; Column 36, line 46, delete "thermal" and insert ---terminal---; Column 36, line 47, after the word "the" insert --- -CO-O- ---.

Signed and sealed this 14th day of March 1972.

(SEAL)
Attest:

EDWARD M. FLETCHER, JR.
Attesting Officer

ROBERT GOTTSCHALK
Commissioner of Patents